(12) United States Patent
Nam et al.

(10) Patent No.: US 11,725,768 B2
(45) Date of Patent: Aug. 15, 2023

(54) VACUUM ADIABATIC BODY, REFRIGERATING OR WARMING APPARATUS, AND METHOD FOR MANUFACTURING VACUUM ADIABATIC BODY

(71) Applicant: LG ELECTRONICS INC., Seoul (KR)

(72) Inventors: Hyeunsik Nam, Seoul (KR); Myoungju Kang, Seoul (KR); Bongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 16/635,776

(22) PCT Filed: Jul. 31, 2018

(86) PCT No.: PCT/KR2018/008694
§ 371 (c)(1),
(2) Date: Jan. 31, 2020

(87) PCT Pub. No.: WO2019/027232
PCT Pub. Date: Feb. 7, 2019

(65) Prior Publication Data
US 2021/0025538 A1    Jan. 28, 2021

(30) Foreign Application Priority Data
Aug. 1, 2017  (KR) .................. 10-2017-0097831

(51) Int. Cl.
*F16L 59/065*   (2006.01)
*B60N 3/10*     (2006.01)
(Continued)

(52) U.S. Cl.
CPC ............ *F16L 59/065* (2013.01); *B60N 3/104* (2013.01); *F16L 59/02* (2013.01); *F25D 11/02* (2013.01);
(Continued)

(58) Field of Classification Search
CPC ....... F16L 59/065; F16L 59/02; F25D 17/065; F25D 16/00; F25D 11/02; F25D 23/066; F25D 2201/14; F25D 23/06; B60N 3/104
See application file for complete search history.

(56) References Cited

U.S. PATENT DOCUMENTS 1,420,711 A    6/1922   Knutson
1,814,114 A    7/1931   Bodman
(Continued)

FOREIGN PATENT DOCUMENTS

CN    2066123    11/1990
CN    1056276    11/1991
(Continued)

OTHER PUBLICATIONS

Chinese Office Action dated Dec. 9, 2020 issued in Application No. 201880050202.3.
(Continued)

*Primary Examiner* — Hanh V Tran
(74) *Attorney, Agent, or Firm* — Ked & Associates

(57) ABSTRACT

A vacuum adiabatic body, a refrigerating or warming apparatus, and a method for manufacturing a vacuum adiabatic body are provided. The vacuum adiabatic body includes a first plate defining at least a portion of a wall for a first space, a second plate defining at least a portion of a wall for a second space having a second temperature different from a first temperature of the first space, and at least one conductive resistance sheet connecting the first and second plates to each other. At least one of a flange of the first plate coupled (Continued)

to the at least one conductive resistance sheet or a flange of the second plate coupled to the at least one conductive resistance sheet is bent.

16 Claims, 14 Drawing Sheets

(51) Int. Cl.
*F16L 59/02* (2006.01)
*F25D 23/06* (2006.01)
*F25D 11/02* (2006.01)
*F25D 16/00* (2006.01)
*F25D 17/06* (2006.01)

(52) U.S. Cl.
CPC ........... *F25D 16/00* (2013.01); *F25D 17/065* (2013.01); *F25D 23/066* (2013.01); *F25D 2201/14* (2013.01)

(56) References Cited

U.S. PATENT DOCUMENTS

| | | | |
|---|---|---|---|
| 1,845,353 A | 2/1932 | Snell | |
| 2,000,882 A * | 5/1935 | Comstock | F25D 23/062 220/592.26 |
| 2,065,608 A | 12/1936 | Munters | |
| 2,464,526 A * | 3/1949 | Johns | F25D 23/082 220/592.08 |
| 2,989,156 A * | 6/1961 | Brooks | F25D 23/06 52/788.1 |
| 3,156,975 A * | 11/1964 | Edward | F25D 23/06 53/440 |
| 3,161,265 A * | 12/1964 | Matsch | E04B 1/803 52/788.1 |
| 3,338,451 A * | 8/1967 | Kesling | F25D 23/082 220/592.08 |
| 3,936,553 A * | 2/1976 | Rowe | E04B 1/806 428/81 |
| 4,545,211 A | 10/1985 | Gaus | |
| 4,545,213 A | 10/1985 | Fujiwara et al. | |
| 4,705,099 A | 11/1987 | Taniguchi et al. | |
| 4,732,432 A * | 3/1988 | Keil | F25D 23/082 220/592.06 |
| 4,826,040 A * | 5/1989 | Jahr, Jr. | B29C 44/18 220/592.11 |
| 4,837,388 A * | 6/1989 | Kugelmann | E04B 1/803 428/69 |
| 5,011,729 A | 4/1991 | McAllister | |
| 5,157,893 A | 10/1992 | Benson et al. | |
| 5,214,877 A | 6/1993 | Kaspar et al. | |
| 5,500,305 A | 3/1996 | Bridges | |
| 5,720,536 A * | 2/1998 | Jenkins | F25D 23/085 312/401 |
| 5,860,594 A | 1/1999 | Reason et al. | |
| 6,038,830 A | 3/2000 | Hirath et al. | |
| 6,088,966 A | 7/2000 | Kenkel | |
| 6,393,798 B1 | 5/2002 | Hirath et al. | |
| 6,769,265 B1 | 8/2004 | Davis | |
| 7,571,582 B2 * | 8/2009 | Hirai | F16L 59/065 52/784.15 |
| 7,891,203 B1 | 2/2011 | Burns et al. | |
| 8,752,921 B2 * | 6/2014 | Gorz | F25D 23/062 312/406.2 |
| 8,765,247 B2 | 7/2014 | Park | |
| 8,822,006 B2 | 9/2014 | Yoon et al. | |
| 9,170,046 B2 | 10/2015 | Jung | |
| 10,274,247 B2 * | 4/2019 | Jeong | F25D 23/067 |
| 10,337,788 B2 | 7/2019 | Jung et al. | |
| 10,543,560 B2 * | 1/2020 | Nakakura | B23K 11/3036 |
| 10,639,743 B2 * | 5/2020 | Azuma | B23K 26/60 |
| 10,753,669 B2 * | 8/2020 | Dherde | F25D 23/028 |
| 10,760,849 B2 | 9/2020 | Jung et al. | |
| 10,823,485 B2 | 11/2020 | Lv et al. | |
| 10,837,696 B2 * | 11/2020 | Jung et al. | |
| 10,899,264 B2 * | 1/2021 | Jung | F25B 21/02 |
| 10,907,887 B2 * | 2/2021 | Jung | F25D 23/06 |
| 10,913,232 B2 | 2/2021 | Dye et al. | |
| 10,941,974 B2 | 3/2021 | Jung et al. | |
| 11,047,616 B2 | 6/2021 | Jeong et al. | |
| 2002/0041134 A1 * | 4/2002 | Wolf | F25D 23/085 312/400 |
| 2002/0056184 A1 | 5/2002 | Richardson et al. | |
| 2004/0080122 A1 | 4/2004 | Beyrie | |
| 2004/0226956 A1 | 11/2004 | Brooks | |
| 2005/0053755 A1 | 3/2005 | Markey | |
| 2009/0007587 A1 | 1/2009 | Lanzl et al. | |
| 2010/0071384 A1 | 3/2010 | Lu | |
| 2010/0251653 A1 | 10/2010 | Mills | |
| 2010/0252698 A1 * | 10/2010 | Dye | F16L 59/065 248/177.1 |
| 2010/0283359 A1 | 11/2010 | Hottmann et al. | |
| 2011/0204065 A1 | 8/2011 | Kolowich | |
| 2011/0241513 A1 | 10/2011 | Nomura | |
| 2012/0103006 A1 | 5/2012 | Jung et al. | |
| 2012/0104923 A1 * | 5/2012 | Jung | F25D 23/066 312/406 |
| 2012/0128920 A1 * | 5/2012 | Yoon | F16L 59/065 428/69 |
| 2012/0196059 A1 | 8/2012 | Fujimori | |
| 2013/0105494 A1 * | 5/2013 | Jung | F25D 23/062 220/592.05 |
| 2013/0105495 A1 * | 5/2013 | Jung | F25D 23/062 220/592.05 |
| 2013/0111942 A1 * | 5/2013 | Jung | F25B 40/00 62/440 |
| 2013/0200084 A1 * | 8/2013 | Jung | B32B 37/14 220/592.09 |
| 2013/0230684 A1 | 9/2013 | Shinoki et al. | |
| 2014/0322481 A1 | 10/2014 | Song et al. | |
| 2015/0044412 A1 | 2/2015 | Miyaji et al. | |
| 2016/0109172 A1 * | 4/2016 | Kim | F25D 23/065 312/404 |
| 2016/0258671 A1 * | 9/2016 | Allard | F25D 23/085 |
| 2018/0017314 A1 | 1/2018 | Jeong et al. | |
| 2018/0216872 A1 | 8/2018 | Jung et al. | |
| 2018/0216873 A1 | 8/2018 | Jung et al. | |
| 2018/0224052 A1 | 8/2018 | Jung et al. | |
| 2018/0224193 A1 | 8/2018 | Jung et al. | |
| 2018/0224194 A1 | 8/2018 | Jung et al. | |
| 2018/0224195 A1 | 8/2018 | Jung et al. | |
| 2018/0224196 A1 | 8/2018 | Jung et al. | |
| 2018/0224197 A1 | 8/2018 | Jeong et al. | |
| 2018/0224198 A1 | 8/2018 | Jung et al. | |
| 2018/0231298 A1 | 8/2018 | Jung et al. | |
| 2018/0231300 A1 | 8/2018 | Jung et al. | |
| 2018/0238486 A1 | 8/2018 | Jung et al. | |
| 2018/0238610 A1 | 8/2018 | Jung et al. | |
| 2018/0356147 A1 | 12/2018 | Jung et al. | |
| 2019/0255980 A1 * | 8/2019 | Jung | F25B 21/04 |
| 2020/0182393 A1 | 6/2020 | Jung et al. | |
| 2021/0140704 A1 | 5/2021 | Kim et al. | |

FOREIGN PATENT DOCUMENTS

| | | |
|---|---|---|
| CN | 1276055 | 12/2000 |
| CN | 1276056 | 12/2000 |
| CN | 1603674 | 4/2005 |
| CN | 2691933 | 4/2005 |
| CN | 2720362 | 8/2005 |
| CN | 102121781 | 7/2011 |
| CN | 102455103 | 5/2012 |
| CN | 102455105 | 5/2012 |
| CN | 103090616 | 5/2013 |
| CN | 103502756 | 1/2014 |
| CN | 104204646 | 12/2014 |
| CN | 104296490 | 1/2015 |
| CN | 204141054 | 2/2015 |
| CN | 104457117 | 3/2015 |
| CN | 104482707 | 4/2015 |
| CN | 104833157 | 8/2015 |
| CN | 104913571 | 9/2015 |

(56) References Cited

FOREIGN PATENT DOCUMENTS

| | | |
|---|---|---|
| CN | 205350719 | 6/2016 |
| CN | 106016957 | 10/2016 |
| CN | 205784134 | 12/2016 |
| CN | 106500428 | 3/2017 |
| CN | 106766594 | 5/2017 |
| CN | 107257907 | 10/2017 |
| CN | 107923701 | 4/2018 |
| CN | 208281706 | 12/2018 |
| CN | 208472996 | 2/2019 |
| CN | 109403210 | 3/2019 |
| DE | 10 2011 050472 | 11/2011 |
| EP | 1 564 513 | 8/2005 |
| EP | 2154457 | 2/2010 |
| EP | 2462372 | 10/2016 |
| GB | 890372 | 2/1962 |
| JP | S 60-179344 | 9/1985 |
| JP | 01-142379 | 6/1989 |
| JP | 01-179882 | 7/1989 |
| JP | H05-9298 | 2/1993 |
| JP | H07-091591 | 4/1995 |
| JP | 2001-277396 | 10/2001 |
| JP | 2002-071088 | 3/2002 |
| JP | 2002-221295 | 8/2002 |
| JP | 2003-042388 | 2/2003 |
| JP | 2004-211376 | 7/2004 |
| JP | 2006-082604 | 3/2006 |
| JP | 2012-021615 | 2/2012 |
| JP | 2012-207682 | 10/2012 |
| JP | 2013-007439 | 1/2013 |
| JP | 2013-108738 | 6/2013 |
| JP | 2013-189996 | 9/2013 |
| JP | 5316672 | 10/2013 |
| JP | 2014-051993 | 3/2014 |
| KR | 10-2001-0073363 | 8/2001 |
| KR | 10-0343719 | 7/2002 |
| KR | 10-0363646 | 11/2002 |
| KR | 20-030619 | 2/2003 |
| KR | 10-2004-0002175 | 1/2004 |
| KR | 10-2004-0042682 | 5/2004 |
| KR | 10-2007-0037274 | 4/2007 |
| KR | 10-0845153 | 7/2008 |
| KR | 10-2010-0109653 | 10/2010 |
| KR | 10-011-0015327 | 2/2011 |
| KR | 10-2011-0113414 | 11/2011 |
| KR | 10-2012-0139648 | 12/2012 |
| KR | 10-2013-0084561 | 7/2013 |
| KR | 10-1456376 | 10/2014 |
| KR | 10-2015-0012712 | 2/2015 |
| KR | 10-2015-0109727 | 8/2015 |
| KR | 10-2016-0079278 | 7/2016 |
| KR | 20-2017-0000187 | 1/2017 |
| KR | 10-2017-0016190 | 2/2017 |
| KR | 10-2017-0016244 | 2/2017 |
| KR | 10-2017-0071623 | 6/2017 |
| KR | 10-2018-0095281 | 8/2018 |
| RU | 2073285 | 2/1997 |
| RU | 2252377 | 5/2005 |
| RU | 2496063 | 10/2013 |
| RU | 2553251 | 6/2015 |
| RU | 2608791 | 1/2017 |
| RU | 2 627 067 | 8/2017 |
| WO | WO 91/19867 | 12/1991 |
| WO | WO 01/04553 | 1/2001 |
| WO | WO 02/069673 | 9/2002 |
| WO | WO 2012/176880 | 12/2012 |
| WO | WO 2015/189009 | 12/2015 |
| WO | WO 2016/105019 | 6/2016 |
| WO | WO 2017/023072 | 2/2017 |
| WO | WO 2017/023073 | 2/2017 |
| WO | WO 2017/023075 | 2/2017 |
| WO | WO 2017/023076 | 2/2017 |
| WO | WO 2017/023077 | 2/2017 |
| WO | WO 2017/023087 | 2/2017 |
| WO | WO 2017/023088 | 2/2017 |
| WO | WO 2017/023089 | 2/2017 |
| WO | WO 2017/023090 | 2/2017 |
| WO | WO 2017/023094 | 2/2017 |
| WO | WO 2017/023095 | 2/2017 |
| WO | WO 2017/023097 | 2/2017 |
| WO | WO 2017/023100 | 2/2017 |
| WO | WO 2017/023102 | 2/2017 |
| WO | WO-2017023089 A1 * | 2/2017 .......... F25D 23/062 |
| WO | WO 2017/105030 | 6/2017 |

OTHER PUBLICATIONS

United States Office Action dated Sep. 27, 2021 issued in co-pending related U.S. Appl. No. 16/637,861.
Russian Office Action dated Jun. 22, 2020 issued in RU Application No. 2020108484.
Chinese Office Action dated Dec. 9, 2020 issued in CN Application No. 201880053044.7.
European Search Report issued in Application No. 18840899.1 dated Apr. 7, 2021.
Chinese Office Action dated Dec. 2, 2020 issued in Application No. 201880050497.4.
U.S. Office Action dated May 3, 2021 issued in U.S. Appl. No. 16/635,793.
Chinese Office Action dated Feb. 1, 2021 issued in CN Application No. 201880050501.7.
Russian Office Action dated Feb. 20, 2021.
U.S. Office Action dated Jul. 7, 2021 issued in U.S. Appl. No. 16/635,729.
Australian Office Action dated Mar. 9, 2021 issued in AU Application No. 2018309541.
European Search Report dated Mar. 30, 2021 issued in EP Application No. 18840503.9.
U.S. Appl. No. 16/635,699, filed Jan. 21, 2020.
International Search Report and Written Opinion dated Nov. 8, 2018 issued in Application No. PCT/KR2018/008687.
International Search Report and Written Opinion dated Nov. 21, 2018 issued in Application No. PCT/KR2018/008691.
International Search Report and Written Opinion dated Nov. 23, 2018 issued in Application No. PCT/KR2018/008689.
International Search Report and Written Opinion dated Nov. 29, 2018 issued in Application No. PCT/KR2018/008698.
European Search Report dated Mar. 24, 2021 issued in Application No. 18846385.5.
European Search Report dated Mar. 24, 2021 issued in Application No. 18840407.3.
European Search Report issued in Application No. 18840183.0 dated Mar. 29, 2021.
Australian Office Action dated Feb. 11, 2021 issued in AU Application No. 2018309538.
European Search Report dated Mar. 24, 2021 issued in EP Application No. 18842051.7.
International Search Report and Written Opinion dated Nov. 23, 2018 issued in Application No. PCT/KR2018/008694.
Russian Office Action dated Sep. 18, 2020 issued in Application No. 2020110370/12.
Australian Examination Report dated Feb. 17, 2021 issued in Application No. 2018309544.
Korean Office Action dated Dec. 21, 2021 issued in KR Application No. 10-2017-0097793.
Korean Office Action dated Dec. 21, 2021 issued in KR Application No. 10-2017-0097804.
Chinese Office Action dated Sep. 28, 2021 issued in CN Application No. 201880050571.2.
Chinese Office Action dated Sep. 3, 2021 issued in CN Application No. 201880050572.7.
U.S. Appl. No. 16/635,793, filed Jan. 31, 2020.
U.S. Office Action issued in U.S. Appl. No. 16/635,758 dated Mar. 30, 2022.
Russian Office Action dated Mar. 9, 2022 issued in RU Application No. 2020142423.
Korean Office Action dated Dec. 24, 2021 issued in KR Application No. 10-2017-0097831.

(56) References Cited

OTHER PUBLICATIONS

Chinese Office Action dated Apr. 15, 2022 issued in CN Application No. 201880050571.2.
Chinese Office Action issued in Application No. 202110908473.1 dated Jul. 5, 2022.
Chinese Office Action issued in Application No. 202110909689.X dated Jul. 12, 2022.
Korean Office Action dated Jul. 23, 2022 issued in Application No. 10-2017-0103444.
U.S. Appl. No. 16/635,729, filed Jan. 31, 2020.
United States Office Action dated Sep. 21, 2022 issued in co-pending related U.S. Appl. No. 16/635,758.
United States Notice of Allowance dated Dec. 14, 2022 issued in co-pending related U.S. Appl. No. 16/635,758.
European Search Report issued in Application No. 22180209.3 dated Nov. 9, 2022.
Korean Office Action issued in Application No. 10-2022-0092973 dated Jan. 18, 2023.
U.S. Appl. No. 16/635,699, filed Jan. 31, 2020.
U.S. Appl. No. 17/976,348, filed Oct. 28, 2022.
U.S. Appl. No. 16/635,758, filed Jan. 31, 2020.
U.S. Appl. No. 18/124,038, filed Mar. 21, 2023.
U.S. Appl. No. 16/635,776, filed Jan. 31, 2020.
U.S. Appl. No. 17/583,566, filed Jan. 25, 2022.
U.S. Appl. No. 16/637,861, filed Feb. 10, 2020.
Chinese Office Action issued in Application No. 202210666073.9 dated Mar. 30, 2023.

\* cited by examiner

VACUUM ADIABATIC BODY, REFRIGERATING OR WARMING APPARATUS, AND METHOD FOR MANUFACTURING VACUUM ADIABATIC BODY

This application is a U.S. National Stage Application under 35 U.S.C. § his application is a PCT/KR2018/008694, filed Jul. 31, 2018, which claims priority to Korean Patent Application No. 10-2017-0097831, filed Aug. 1, 2017, whose entire disclosures are hereby incorporated by reference.

BACKGROUND

1. Field

A refrigerating or warming apparatus, a vacuum adiabatic body, and a method for manufacturing a vacuum adiabatic body are disclosed herein.

2. Background

A refrigerator is an apparatus for storing products, such as foods, received in the refrigerator at a low temperature including sub-zero temperatures. As a result of this action, there is an advantage that a user's intake with respect to the products may be improved, or a storage period of the products may be lengthened.

Refrigerators are classified into indoor refrigerators using a commercial power source or outdoor refrigerators using a portable power source. In addition, in recent years, a refrigerator for a vehicle, which is used after fixedly mounted on the vehicle, has been increasing in demand. The refrigerator for the vehicle is increasingly in demand due to an increase in supply of vehicles and an increase in premium-class vehicle.

A conventional configuration of the refrigerator for the vehicle will be described hereinafter. For a first example, there is an example in which heat in the refrigerator is forcibly discharged outside of the refrigerator using a thermoelement. However, there is a limitation in that a cooling rate is slow due to low thermal efficiency of the thermoelement deteriorating user satisfaction.

For another example, there is an example in which a refrigerant or cold air is drawn from an air conditioning system installed for air-conditioning an entire interior of the vehicle and used as a cooling source for the refrigerator for the vehicle. In this example, there is a disadvantage that a separate flow path of air or refrigerant is required to draw the air or refrigerant from the air conditioning system of the vehicle. Also, there is a limitation that low-temperature energy is lost during movement of the air or refrigerant through the flow path. Also, there is a limitation that a position at which the refrigerator for the vehicle is installed is limited to a position that is adjacent to the air conditioning system of the vehicle due to the above-described limitations.

For another example, there is an example in which a refrigeration cycle using a refrigerant is applied. However, in this example, as a component constituting the refrigeration cycle is large in size, most of the component is mounted in a trunk, and only a door of the refrigerator is opened to the inside of the vehicle. In this case, there is a limitation that a position for installing the refrigerator for the vehicle is limited. Also, there is a limitation that the trunk is significantly reduced in volume to reduce an amount of cargo capable of being loaded in the trunk.

U.S. Pat. No. 4,545,211 is a representative example of the above-mentioned example. The technology of the cited document has the following limitations.

There is a limitation that an internal volume of the vehicle refrigerator is reduced due to a large volume of a machine room. There is a limitation that the driver may not use the vehicle refrigerator without stopping driving when the driver is alone in the vehicle because the refrigerator is installed in the back seat. Also, as the door is opened forward, there is inconvenience that it may not put an object in the front. As the cooling in the refrigerator is performed by direct cooling, that is, by natural convection, it takes a long time to cool a product. As the machine room is directly opened to the outside, there is a high possibility that foreign substances are mixed into the inside of the machine room causing a failure. There is a limitation that the suctioned air is mixed again because suction and exhaust of the air are not separated from each other, deteriorating heat efficiency. There is a limitation that inconvenience is caused to the user due to noise of the machine room according to use of the compressor.

To improve the above-described limitations, the present applicant had filed Korean Patent Application No. 10-2017-0021561. However, according to the embodiment, there is still a problem that conduction heat loss is still large. Also, there is a limitation in that the entire product had to be disposed of when the vacuum adiabatic body has a vacuum damage. Also, there is a limitation that a stepped portion is formed at an edge of the vacuum adiabatic body and additional work is required to eliminate the stepped portion.

An object of embodiments is to reduce conduction heat transfer between inner and outer plate members of a vacuum adiabatic body. Another object of embodiments is to propose a method of utilizing an article to be discarded due to incomplete vacuum sealing of a vacuum adiabatic body. Another object of embodiments is to provide a method for removing a stepped portion occurring on an edge of a vacuum adiabatic body.

In order to reduce conduction heat transfer between inner and outer plate members of a vacuum adiabatic body, at least one of flange parts, to which a conductive resistance sheet is coupled, of the inner and outer plates may be bent. In order to utilize an article to be discarded due to incomplete vacuum sealing of the vacuum adiabatic body, the flange parts of the inner and outer plate members may extend in different directions. Coupling surfaces, to which a sealing part is provided, of the flange parts may extend in different directions, and the two coupling surfaces may extend at an angle of 90 degrees.

In order to remove a stepped portion occurring on an edge of the vacuum adiabatic body, at least one of the plate members may include two bent parts on the flange parts. In order to improve adiabatic performance due to the conductive resistance sheet, the conductive resistance sheet may have at least two flat surfaces that are exposed to a third space.

According to embodiments, adiabatic efficiency of the vacuum adiabatic body and adiabatic performance due to conduction insulation may increase. According to embodiments, vacuum sealing may be reworked, and production yield of the product may increase. According to embodiments, a degree of completeness of the product may increase, and an internal space may increase by simplifying the surface of the edge of the vacuum adiabatic body.

The details of one or more embodiments are set forth in the accompanying drawings and the description below. Other features will be apparent from the description and drawings, and from the claims.

DETAILED DESCRIPTION

Figure 1:
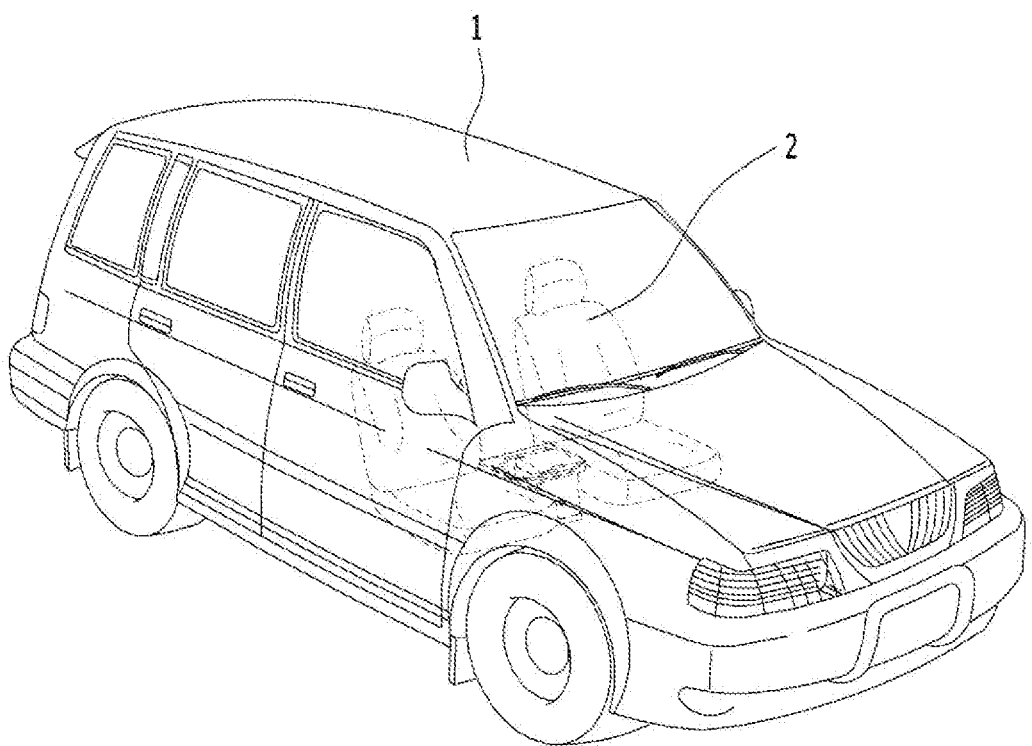
FIG. 1 is a perspective view of a vehicle according to an embodiment.

In the following description of embodiments with reference to the drawings, the same reference numerals are given to different drawings in the case of the same components. Also, in the description of each drawing, the description will be made with reference to a direction in which the vehicle is viewed from a front of the vehicle, rather than the front viewed by a driver based on a traveling direction of the vehicle. For example, the driver is on the right, and the assistant driver is on the left.

FIG. 1 is a perspective view of a vehicle according to an embodiment. Referring to FIG. 1, a seat 2 on which a user is seated is provided in a vehicle 1. The seat 2 may be provided in a pair horizontally spaced apart from each other. A console is disposed between the seats 2, and a driver places items that are necessary for driving or components that are necessary for manipulating the vehicle on the console. Front seats in which the driver and the assistant driver are seated may be described as an example of the seats 2. It should be understood that the vehicle includes various components, which are necessary for driving the vehicle, such as a moving device, such as a wheel, a driving device, such as an engine, and a steering device, such as a steering wheel.

The refrigerator for the vehicle according to an embodiment may be placed on the console. However, embodiments are not limited thereto. For example, the refrigerator for the vehicle may be installed in various spaces. For example, the refrigerator for the vehicle may be installed in a space between rear seats, a door, a globe box, and a center fascia. This is one of factors that the refrigerator for the vehicle according to an embodiment is capable of being installed only when power is supplied, and a minimum space is secured. However, it is a great advantage of the embodiment in that it may be installed in the console between the seats, which is limited in space due to limitations in vehicle design.

Figure 2:
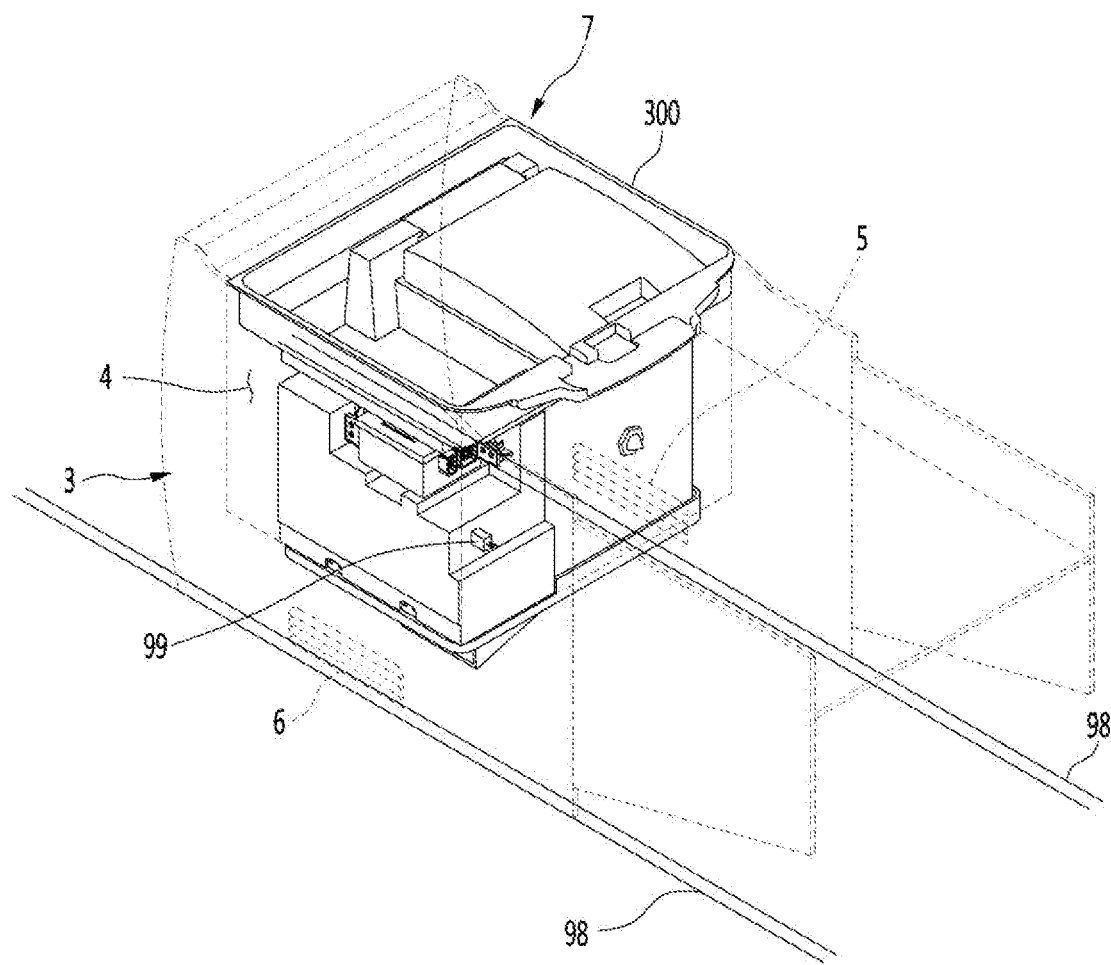
FIG. 2 is an enlarged perspective view illustrating a console of the vehicle.

FIG. 2 is an enlarged perspective view illustrating the console of the vehicle. Referring to FIG. 2, a console 3 may be provided as a separate part made of a material, such as a resin. A steel frame 98 may be provided below the console 3 to maintain a strength of the vehicle, and a sensor part (sensor) 99, such as a sensor, may be disposed in a space part (space) between the console 3 and the steel frame 98. The sensor part 99 may be a part that is necessary for accurately sensing an external signal and measuring a signal at a position of the driver. For example, an airbag sensor that is directly connected to a life of the driver may be mounted.

The console 3 may have a console space 4 therein, and the console space 4 may be covered by a console cover 300. The console cover 300 may be installed to the console 3 in a fixed type. Thus, it is difficult for external foreign substances to be introduced into the console through the console cover 300. A vehicle refrigerator 7 is seated in the console space 4.

A suction port 5 may be provided in a right (first) surface of the console 3 to introduce air within the vehicle into the console space 4. The suction port 5 may face the driver. An exhaust port 6 may be provided in a left (second) surface of the console 3 to exhaust warmed air while the vehicle refrigerator operates from inside of the console space 4. The exhaust port 6 may face the assistant driver. A grill may be provided in each of the suction port 5 and the exhaust port 6 to prevent a user's hand from being inserted and thereby to provide safety, prevent an object, which falls from an upper side, from being introduced, and allow air to be exhausted to flow downward so as not to be directed to the person.

Figure 3:
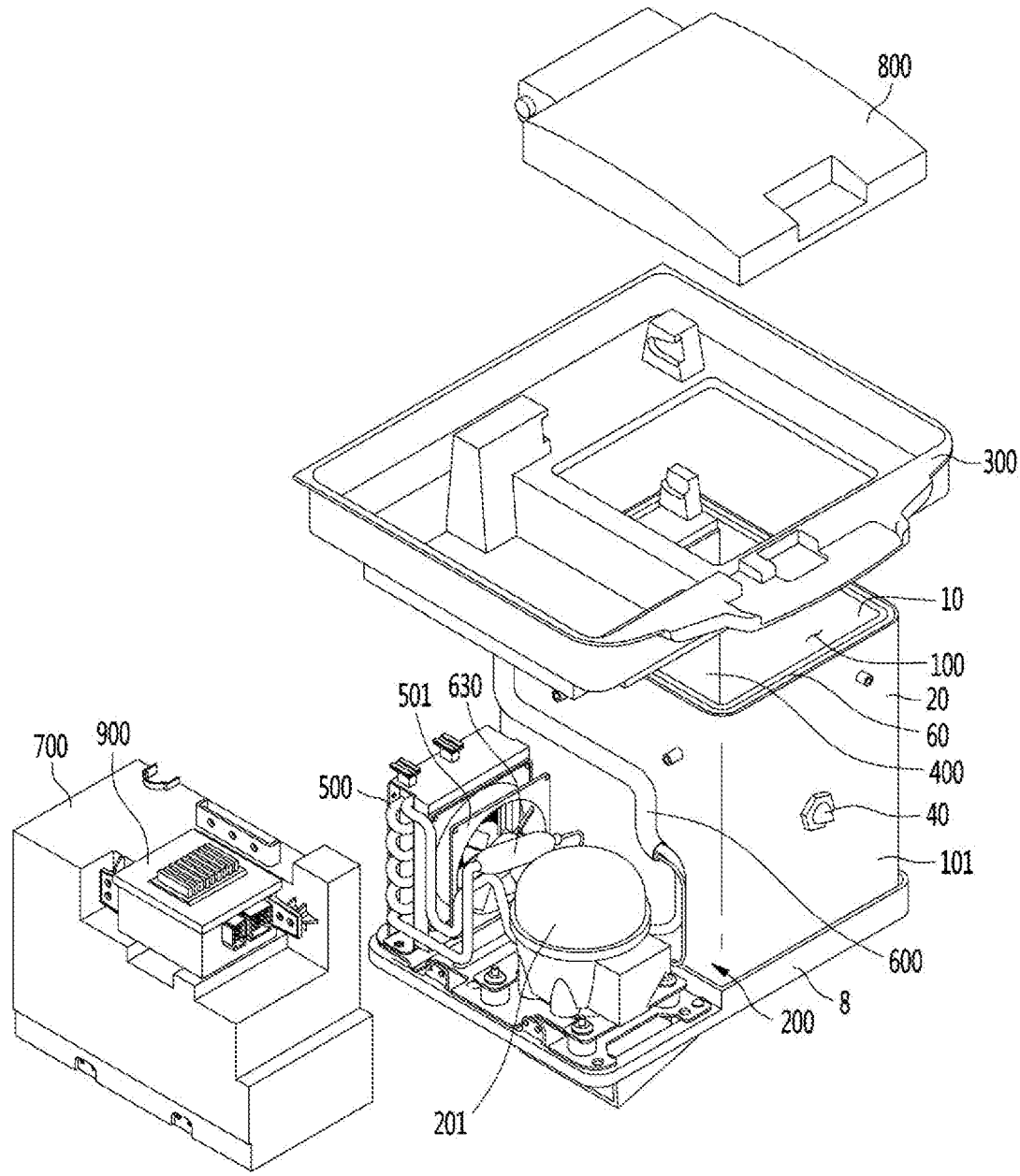
FIG. 3 is a schematic perspective view illustrating an inside of a vehicle refrigerator.

FIG. 3 is a schematic perspective view illustrating an inside of a vehicle refrigerator. Referring to FIG. 3, the vehicle refrigerator 7 includes a refrigerator bottom frame 8 that supports parts (components), a machine room 200 provided in a left (first) side of the refrigerator bottom frame 8, and a cavity 100 provided in a right (second) side of the refrigerator bottom frame 8. The machine room 200 may be covered by a machine room cover 700, and an upper side of the cavity 100 may be covered by the console cover 300 and a door 800. The machine room cover 700 may not only guide a passage of cooling air, but also prevent foreign substances from being introduced into the machine room 200.

A controller 900 may be disposed on the machine room cover 700 to control an overall operation of the vehicle refrigerator 7. As the controller 900 is installed at the above-described position, the vehicle refrigerator 7 may be controlled to operate without problems in a proper temperature range in a narrow space inside of the console space 4.

That is, the controller 900 may be cooled by air flowing through a gap between the machine room cover 700 and the console cover 300 and separated from an inner space of the machine room 200 by the machine room cover 700. Thus, the controller 900 may not be affected by heat within the machine room 200.

The console cover 300 may not only cover an open upper portion of the console space 4, but also cover an upper edge of the cavity 100. The door 800 may be installed on the console cover 300 to allow the user to open and close an opening through which products are dispensed to the cavity 100. The door 800 may be opened using rear portions of the console cover 300 and the cavity 100 as hinge points. The opening of the console cover 300, the door 800, and the cavity 100 may be performed by easily manipulating the door 800 by the user because the console cover 300, the door 800, and the cavity 100 are horizontally disposed when viewed from the user and also disposed at a rear side of the console.

A condensation module 500, a dryer 630, and a compressor 201 may be successively installed in the machine room 200 in a flow direction of the cooling air. A refrigerant conduit 600 for allowing the refrigerant to smoothly flow is provided in the machine room 200. A portion of the refrigerant conduit 600 may extend to the inside of the cavity 100 to supply the refrigerant. The refrigerant conduit 600 may extend to the outside of the cavity 100 through the upper opening through which the products are introduced into the cavity 100.

The cavity 100 has an open top surface and five surfaces that are covered by a vacuum adiabatic body 101. The cavity 100 may be thermally insulated by an individual vacuum adiabatic body or one or more vacuum adiabatic bodies communicating with each other. The cavity 100 may be provided by the vacuum adiabatic body 101. Also, the cavity 100 through which the products are accessible through one surface opened by the vacuum adiabatic body 101 may be provided.

The vacuum adiabatic body 101 may include a first plate member (first plate) 10 providing a boundary of a low-temperature inner space of the cavity 100, a second plate member (second plate) 20 providing a boundary of a high-temperature outer space, and a conductive resistance sheet 60 blocking heat transfer between the plate members 10 and 20. As the vacuum adiabatic body 101 has a thin adiabatic thickness to maximally obtain adiabatic efficiency, the cavity 100 having a large capacity may be realized.

An exhaust and getter port for the exhaust of the inner space of the vacuum adiabatic body 101 and for installing a getter that maintains the vacuum state may be provided on one surface. The exhaust and getter port 40 may provide the exhaust and getter together to contribute to miniaturization of the vehicle refrigerator 7.

An evaporation module 400 may be installed in the cavity 100. The evaporation module 400 may evaporate the refrigerant introduced into the cavity 100 through the refrigerant conduit 600 and forcibly blow cold into the cavity 100.

The evaporation module 400 may be disposed at a rear side within the cavity 100. Thus, the front space within the cavity 100, which is used by the user facing a front side, may be increased to be even larger.

Figure 4:
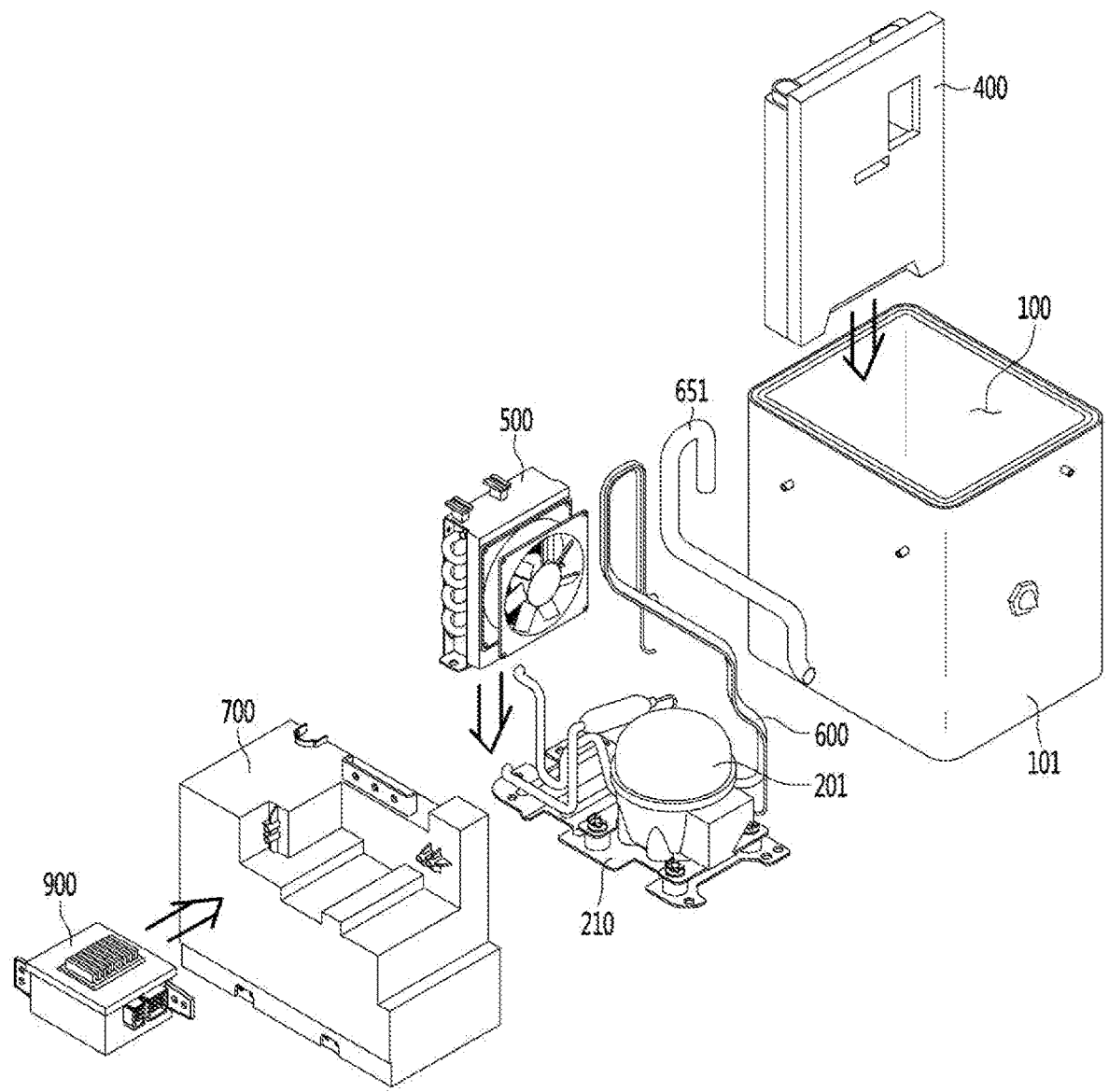
FIG. 4 is a view illustrating a connection relationship between a machine room and a cavity.

FIG. 4 is a view illustrating a connection relationship between a machine room and a cavity. Referring to FIG. 4, the evaporation module 400 is accommodated in the cavity 100. That is, the evaporation module 400 is disposed in the inner space of the cavity 100 having the vacuum adiabatic body 101 as an outer wall. Thus, the machine room 200 may be improved in space efficiency, and the cavity 100 may increase in inner space. This is because the vacuum adiabatic body achieves high adiabatic performance even though the vacuum adiabatic body has a thin thickness.

The refrigerant conduit 600 guides the refrigerant into the evaporation module 400 over a top surface of the cavity 100.

It may be considered that the refrigerant conduit 600 passes through the vacuum adiabatic body 101 to reduce a volume thereof. However, as the vehicle has a lot of vibration, and the inside of the vacuum adiabatic body 101 is maintained in considerably high vacuum state, sealing of the contact portion between the refrigerant conduit 600 and the vacuum adiabatic body 101 may be damaged. Thus, it is not advantageous for the refrigerant conduit 600 passes through the vacuum adiabatic body 101. For example, air leakage due to vibration of the vehicle may occur. If air leaks from the vacuum adiabatic body, it may be expected that the adiabatic effect is significantly deteriorated.

The evaporation module 400 may be installed to contact a hinge point of the door within the cavity 100, i.e., a rear surface within the cavity 100. This is because a path that is necessary for allow the refrigerant conduit 600 to extend up to the evaporation module 400 is as short as possible for ensuring the internal volume of the cavity 100. Also, the inner volume of the cavity may be maximized.

It is more advantageous that the refrigerant conduit 600 passing over the vacuum adiabatic body 101 passes through the hinge point of the door. If the evaporation module 400 is out of the hinge point of the door, a capacity of the cavity and low-temperature energy may be lost due to extension of the refrigerant conduit 600 and insulation of the refrigerant conduit 600.

The condensation module 500 may be coupled by a rear coupling unit of the machine room bottom frame 210. Air suctioned through the condensation module 500 may cool the compressor 201 and then be discharged downward from the compressor 201.

The machine room cover 700 may be coupled to a left (first) side of the cavity 100 to cover the machine room 200. Air flow for cooling may occur an upper side of the machine room cover 700, and the controller 900 may be provided in the cooling passage to perform sufficient cooling action.

Figure 5:
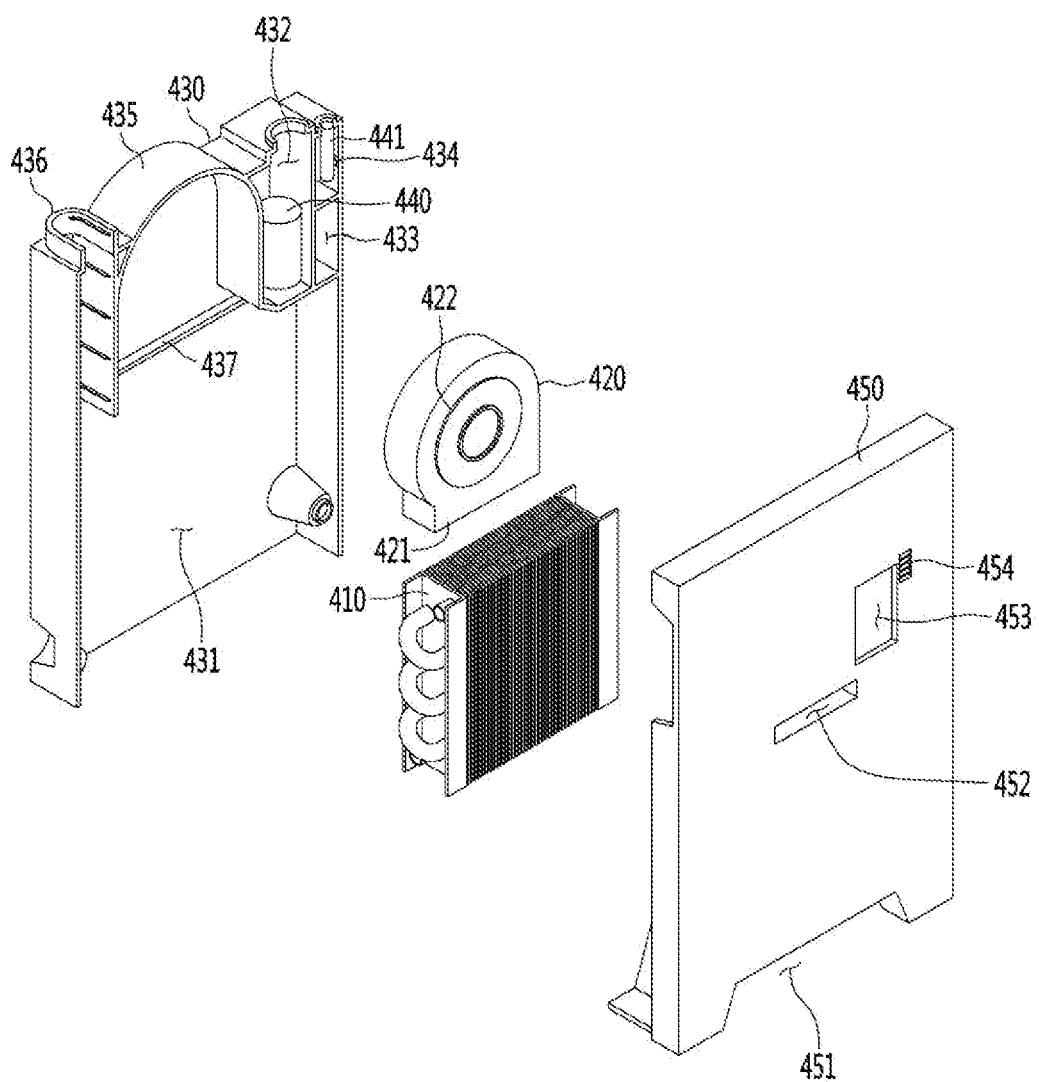
FIG. 5 is an exploded perspective view of an evaporation module.

FIG. 5 is an exploded perspective view of an evaporation module. Referring to FIG. 5, the evaporation module 400 includes a rear cover 430 disposed at a rear side to accommodate the parts and a front cover 450 disposed at a front side of the rear cover 430 to face the cavity 100. A space may be provided inside by the front cover 450 and the rear cover 430 to accommodate the parts in the space.

In the space defined by the front cover 450 and the rear cover 430, an evaporator 410 is disposed at a lower side, and an evaporation fan 420 is disposed at an upper side. A centrifugal fan capable of being mounted in a narrow space may be used as the evaporation fan 420. More particularly, a sirocco fan including a fan inlet 422 having a large area to suction air and a fan outlet 421 that blows air at a high speed in a predetermined discharge direction in a narrow space may be used as the evaporation fan 420. As the sirocco fan may be driven with low noise, it is also possible to use the sirocco fan in a low noise environment.

The air passing through the evaporator 410 is suctioned into the fan inlet 422, and the air discharged from the fan outlet 421 is discharged to the cavity 100. For this, a predetermined space may be provided between the evaporation fan 420 and the rear cover 430.

A plurality of compartments may be provided in the rear cover 430 to accommodate the parts. Particularly, the evaporator 410 and the evaporation fan 420 are disposed in a first compartment 431 to guide a flow of cold air. A lamp 440 may be disposed in a second compartment 432 to brighten the inside of the cavity 100 so that the user looks inside of the cavity 100. A temperature sensor 441 is disposed in a fourth compartment 434 to measure an inner temperature of the cavity 100 and thereby to control a temperature of the vehicle refrigerator.

When the temperature sensor 441 disposed in the fourth compartment 434 measures the inner temperature of the cavity 100, the flow in the cavity may not be affected. That is, the cold air of the evaporator 410 may not have a direct influence on a third compartment 433. Although the third compartment 433 is removed in some cases, the third compartment 433 may be provided to prevent an error of the inner temperature of the cavity 100 from occurring by conductive heat.

The fourth compartment 434 and the temperature sensor 441 are disposed at a left upper end, i.e., a vertex of the evaporation module 400, which is farthest from the evaporator 410. This is to prevent cold air from having an influence on the evaporator 410. That is, to prevent the cold air of the evaporator 410 from having a direct influence on the fourth compartment 434 through conduction, the fourth compartment 434 and the temperature sensor 441 may be isolated from the first compartment 431 by other compartments 432 and 433.

An inner structure of the first compartment 431 will be described in detail. A fan housing 435 is provided in a circular shape so that the evaporation fan 420 is disposed at an upper side of the first compartment 431, and an evaporator placing part 437 on which the evaporator 410 is placed is provided at a lower side. A conduit passage 436 is provided in a left (first) side of the fan housing 435.

The conduit passage 436 may be a portion through which refrigerant conduit 600 passing over the vacuum adiabatic body 101 is guided into the evaporation module 400 and be provided in a left (first) corner portion of the evaporation module. The refrigerant conduit 600 may include two conduits surrounded by the adiabatic material so that the two conduits through which the evaporation module 400 is inserted and withdrawn are heat-exchanged with each other. Thus, the conduit passage 436 may have a predetermined volume. The conduit passage 436 may vertically extend from a left (first) side of the evaporation module 400 to improve space density inside of the evaporation module 400.

As described above, the evaporator 410 and the evaporation fan 420 are provided in the rear cover 430 to perform cooling of air within the cavity and circulation of air within the cavity. The front cover 450 has an approximately rectangular shape like the rear cover 430. A cold air inflow hole 451 guiding air toward a lower side of the evaporator 410 and a cold air discharge hole 452 aligned with the fan outlet 421 are provided below the front cover 450. The cold air discharge hole 452 may have a shape an inner surface of which is smoothly bent forward to discharge air, which is discharged downward from the evaporation fan 420, forward. The front cover 450 aligned with the second compartment 432 may be opened, or a window 453 may be provided on the portion of the front cover 450 so that light of the lamp 440 is irradiated into the cavity 100.

An air vent hole 454 is defined in the front cover 450 aligned with the fourth compartment 434. The air discharged from the cold air discharge hole 452 circulates inside of the cavity 100 and then is introduced into the air vent hole 454. Thus, the inner temperature of the cavity 100 may be more accurately detected. For example, the inner temperature of the cavity 100 may be erroneously measured by a large amount of cold air discharged from the cold air discharge hole 452. The cold air may cause a static temperature inside of the cavity to have a direct influence without affecting the cold air blown from the evaporation fan 420. For this, the fourth compartment 434 may be disposed at the uppermost right end of the rear surface of the cavity.

Figure 6:
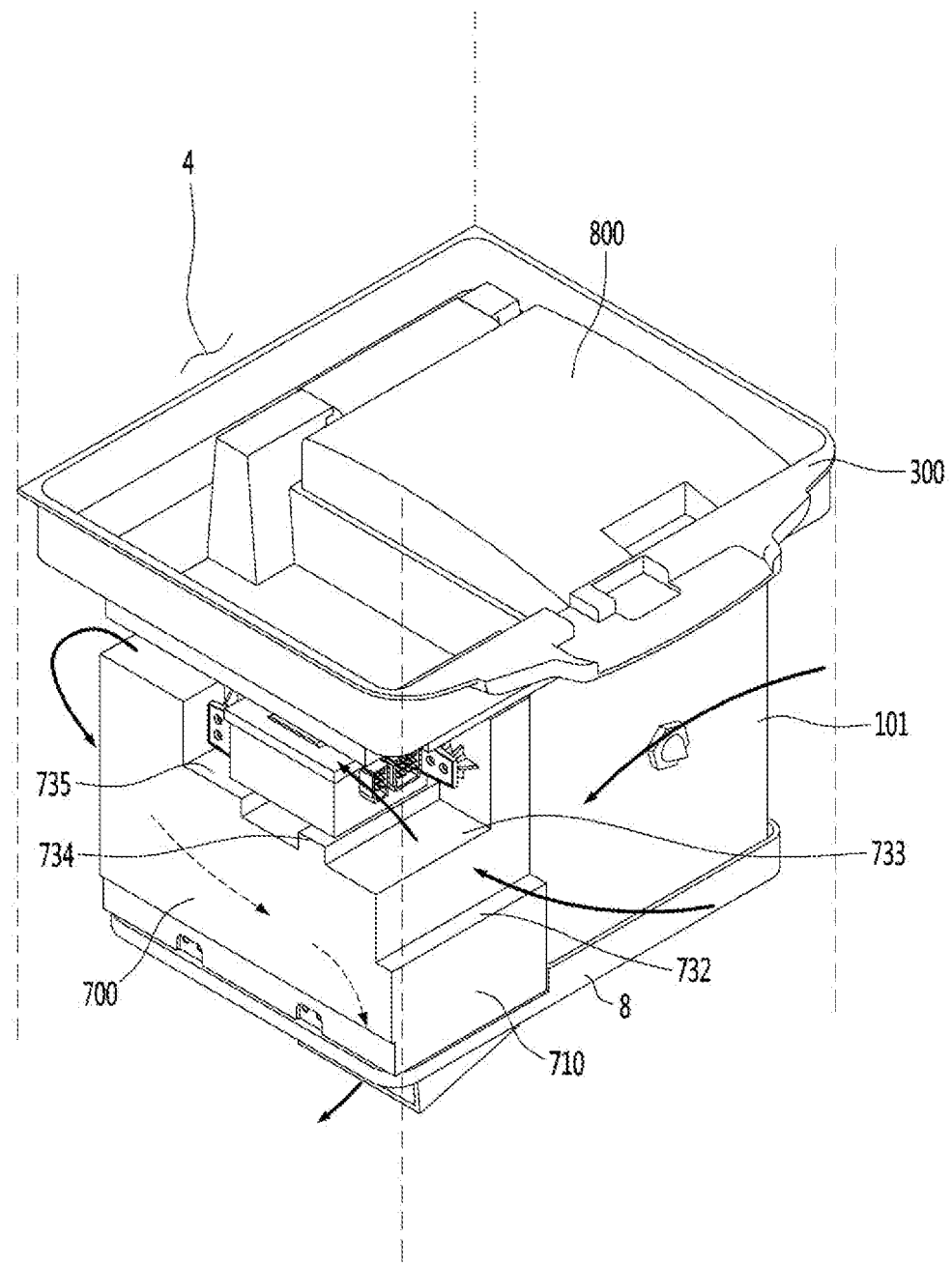
FIG. 6 is a view for explaining an air flow outside of a machine room of the vehicle refrigerator.

FIG. 6 is a view for explaining an air flow outside of a machine room of the vehicle refrigerator. Referring to FIG. 6, air introduced into the suction port 5 moves to a left (first) side of the vehicle refrigerator through a space between the vacuum adiabatic body 101 defining a front wall of the cavity 100 and a front surface of the console space 4. As a heating source is not provided at a right (second) side of the vehicle refrigerator, the suction air may be maintained at its original temperature.

The air moving to the left side of the vehicle refrigerator may be changed in direction to a rear side to move along a top surface of the machine room cover 700 outside of the machine room 200. To smoothly guide the air flow, the machine room cover 700 may have a height that gradually increases backward from the front surface 710. Also, to provide a region in which the controller 900 is disposed, and prevent the parts within the machine room 200 from interfering in position with each other, a stepped part (step) may be disposed on a top surface of the machine room cover 700.

A first stepped part (first step) 732, a second stepped part (second step) 733, and a third stepped part (third step) 735 may be successively provided backward from the front surface. A controller placing part 734 having a same height as the third stepped part 735 is disposed on the second stepped part 733. Due to this structure, the controller 900 may be disposed in parallel to the third stepped part 735 and the controller placing part 734.

The air moving along the top surface of the machine room cover 700 may cool the controller 900. When the controller 900 is cooled, the air may be slightly heated.

The air moving up to the rear side of the machine room cover 700 flows downward. An opened large cover suction port is defined in the rear surface of the machine room 200. For this, a predetermined space may be provided between the rear surface of the machine room cover 700 and the rear surface of the console space 4. Thereafter, the air cooling the inside of the machine room cover 700 is discharged to the outside through a bottom of the machine room 200.

As described above, the evaporation module 400 is disposed at a rear side of the cavity 100, and the refrigerant conduit 600 supplying the refrigerant into the evaporation module 400 passes over the cavity 100. In addition, a hinge of the door 800 and the evaporation module 400 are placed on the rear side of the cavity 100 so that a rear portion of the cavity 100 is vulnerable to thermal insulation.

To solve this limitation, a hinge adiabatic member 470 is provided. The hinge adiabatic member 470 performs an adiabatic action on an upper portion of the evaporation module 400, between the evaporation module 400 and a rear wall of the cavity 100, and a contact part between a regeneration adiabatic member 651 inserted into the cavity and an inner space of the cavity. As described above, the console cover 300 is further provided above the hinge adiabatic member 470 to lead to complete heat insulation.

The structure and action of the vacuum adiabatic body 101 will be described in more detail.

Figure 7A:
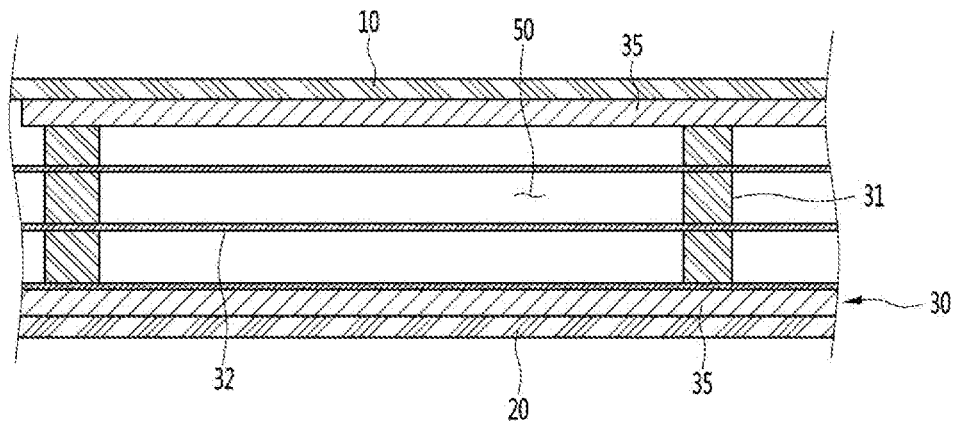
FIGS. 7A-7C are views illustrating an internal configuration of a vacuum adiabatic body according to various embodiments.
Figure 7B:
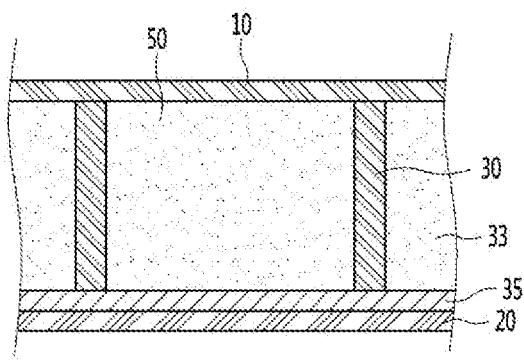
Figure 7C:
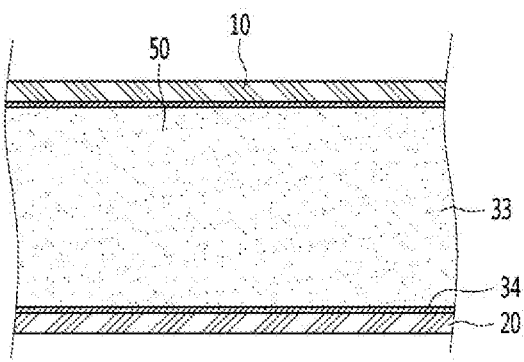

FIGS. 7A-7C are views illustrating an internal configuration of a vacuum adiabatic body according to various embodiments.

First, referring to FIG. 7A, a vacuum space part (space) 50 is provided in a third space having a different pressure from first and second spaces, a vacuum state, thereby reducing adiabatic loss. The third space may be provided at a temperature between a temperature of the first space and a temperature of the second space. A component that resists heat transfer between the first space and the second space may be called a heat resistance unit. Hereinafter, all various components may be applied, or the various components may be selectively applied. In a narrow sense, a component that resists heat transfer between the plate members may be referred to as a heat resistance unit.

The third space is provided as a space in the vacuum state. Thus, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of heat conduction, caused by contact between the plate members 10 and 20.

A supporting unit (support) 30 may be provided to reduce deformation of the vacuum space part 50. The supporting unit 30 includes a bar 31. The bar 31 may extend in a substantially vertical direction with respect to the plate members to support a distance between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20.

The support plate 35 may be provided in a plate shape or may be provided in a lattice shape so that an area of the support plate contacting the first or second plate member 10 or 20 decreases, thereby reducing heat transfer. The bar and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on an extending direction of the bars 31, a total sectional area of the support plate 35 is provided to be greater than that of the bars 31, so that heat transferred through the bars 31 may be diffused through the support plate 35.

The supporting unit 30 may be made of a resin selected from polycarbonate (PC), glass fiber PC, low outgassing PC, polyphenylene sulfide (PPS), and liquid crystal polymer (LCP) to obtain high compressive strength, a low outgassing and water absorption rate, low thermal conductivity, high compressive strength at a high temperature, and superior processability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be used as the material of the radiation resistance sheet 32. In an embodiment, an aluminum foil having an emissivity of 0.02 may be used as the radiation resistance sheet 32. Also, at least one radiation resistance sheet 32 may be provided at a certain distance so as not to contact each other. At least one radiation resistance sheet may be provided in a state in which it contacts the inner surface of the first or second plate member 10 or 20. Even when the vacuum space part 50 has a low height, one sheet of radiation resistance sheet may be inserted. In a case of the vehicle refrigerator 7, one sheet of radiation resistance sheet may be inserted so that the vacuum adiabatic body 101 has a thin thickness, and the inner capacity of the cavity 100 is secured.

Referring back FIG. 7B, a distance between the plate members is maintained by the supporting unit 30, and a porous material 33 may be filled in the vacuum space part 50. The porous material 33 may have a higher emissivity than the stainless material of the first and second plate members 10 and 20. However, as the porous material 33 is filled in the vacuum space part 50, the porous material 33 has a high efficiency for resisting the radiation heat transfer. In the present embodiment, the vacuum adiabatic body may be manufactured without the radiation resistance sheet 32.

Referring to FIG. 7C, the supporting unit 30 for maintaining the vacuum space part 50 may not be provided. A porous material 33 may be provided to be surrounded by a film 34 instead of the supporting unit 30. The porous material 33 may be provided in a state of being compressed so that the interval of the vacuum space part is maintained. The film 34 made of, for example, a polyethylene resin (PE) material may be provided in a state in which a hole is punched in the film 34.

In the present embodiment, the vacuum adiabatic body may be manufactured without the supporting unit 30. That is, the porous material 33 may perform the function of the radiation resistance sheet 32 and the function of the supporting unit 30 together.

Figure 8A:
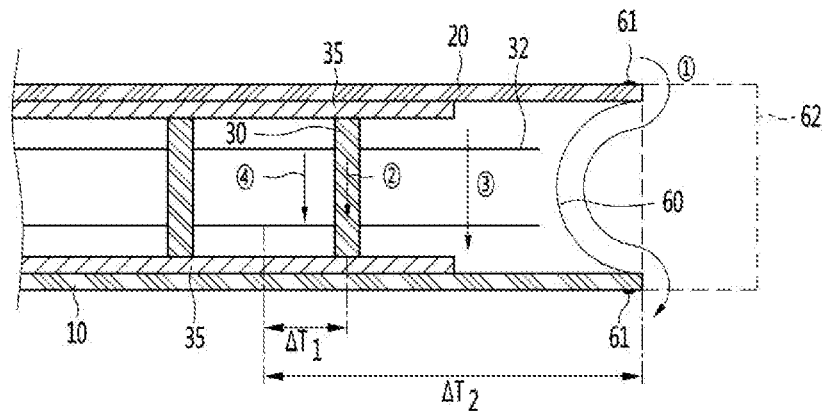
FIGS. 8A-8C are views of a conductive resistance sheet and a peripheral portion of the conductive resistance sheet.
Figure 8B:
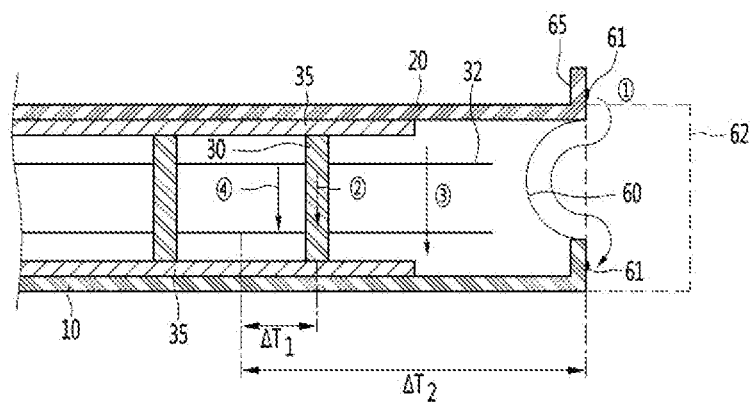
Figure 8C:
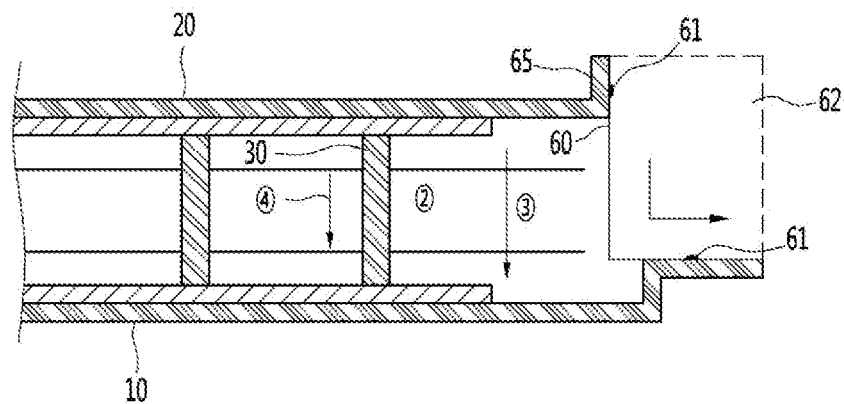

FIGS. 8A-8C are views showing embodiments of conductive resistance sheets and peripheral parts thereof. Referring to FIG. 8A, the first and second plate members 10 and 20 are to be sealed so as to vacuumize the interior of the vacuum adiabatic body. In this case, as the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts (sealing) 61 at both ends of which the conductive resistance sheet 60 are sealed to define at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of a same material, and a stainless material may be used as the material. The sealing parts 61 are not limited to the welding parts, and may be provided through a process, such as cocking. The conductive resistance sheet 60 may be provided in a curved shape. Thus, a heat conduction distance of the conductive resistance sheet 60 is provided longer than a linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part (shield) 62 may be provided at an exterior of the conductive resistance sheet 60 such that an adiabatic action occurs. That is, in a case of the refrigerator 7 for a vehicle, the second plate member 20 has a high temperature and the first plate member 10 has a low temperature. In addition, heat conduction from high temperature to low temperature occurs in the conductive resistance sheet 60, and hence, the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at an exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof.

The shielding part 62 may be provided as a porous substance contacting an outer surface of the conductive resistance sheet 60, may be provided as an adiabatic structure, e.g., a separate gasket, which is placed at the exterior of the conductive resistance sheet 60, or may be provided as the console cover 300 disposed at a position facing the conductive resistance sheet 60.

A heat transfer path between the first and second plate members 10 and 20 will be described with reference to FIG. 8A.

Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside of the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, a distance between the plate members may be changed, and a length of the conductive resistance sheet may be changed. The transfer heat may be changed depending on a difference in temperature between the spaces (the first and second spaces) respectively provided by the plate members. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat}$$ [Equation 1]

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, and an amount, for example, of the porous material.

In the second plate member 20 temperature difference between an average temperature of the second plate and a temperature at a point at which a heat transfer path passing through the conductive resistance sheet 60 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be used.

Referring to FIG. 8B, this configuration is the same as that of FIG. 8A except for portions at which the first plate member 10, and the second plate member 20 are coupled to the conductive resistance sheet 60. Thus, repetitive description has been omitted and only characteristic changes are described.

Ends of the plate members 10 and 20 may be bent to the second space having a high temperature, i.e., the outside of the cavity to form a flange part (flange) 65. A welding part (welding) 61 may be disposed on a top surface of the flange part 65 to couple the conductive resistance sheet 60 to the flange part 65. In this embodiment, the worker may perform welding while facing only any one surface. Thus, as it is unnecessary to perform two processes, the process may be convenient.

In this case, when the first plate member 10 is used on an inner surface of the cavity 100, a stepped portion may not occur on an edge of the inner surface, i.e., an inner edge of the cavity 100. As the stepped portion does not occur on the inner edge of the cavity, the inner space of the cavity may further increase, and a separate finishing process for safety of the user is unnecessary.

Also, it is advantageous to apply the case in which welding of the inside and the outside are difficult as illustrated in FIG. 8A because a space of the vacuum space part 50 is narrow like the vehicle refrigerator 7.

Referring to FIG. 8C, the configuration is the same as those in FIGS. 8A and 8B except for configurations of the flange part 65 and the conductive resistance sheet 60. In this case, the flange part 65 may include two bent parts that are bent twice toward the first plate member 10, and the second plate member 20 may be bent once to provide one bent part.

According to the flange part 65, lengths of a pair of the flange parts 65 are changed so that a length of the conductive resistance sheet 60 becomes longer. Therefore, an effect of further reducing an amount of heat conduction may be obtained. Also, the inner surface of the cavity 100 may have a same height as an inner surface of the vacuum adiabatic body by providing an interval in which a separate cover is provided at the edge of the cavity 100. Also, when vacuum sealing is not perfect, it may be reworked to further improve product yield.

Figure 10:
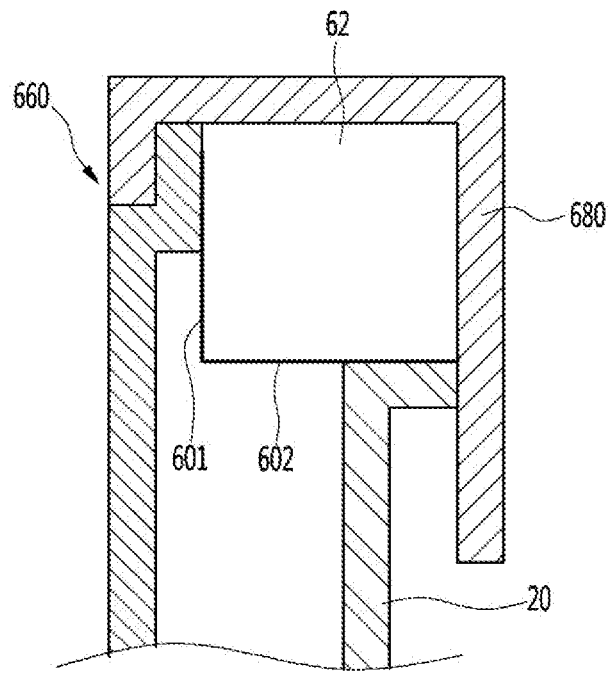
FIG. 10 is a schematic cross-sectional view illustrating an end of the plate member.

FIG. 10 is a schematic cross-sectional view illustrating an end of the plate member. Referring to FIG. 10, two bent parts are provided at the inner flange part (inner flange) 660 disposed on the end of the first plate member 10. One (first) bent part is provided at the outer flange part (outer flange) 670 disposed on the end of the second plate member 20. Also, the inner flange part 660 and the outer flange part 670 may be disposed at different positions. That is, in the positions of the plate members 10 and 20, at which the flange parts 660 and 670 are disposed, the inner flange part 660 is further outward in an inlet direction of the vacuum adiabatic body 101.

According to this configuration, the length of the conductive resistance sheet 60 may be made longer. That is, an interval Δy may be added in accordance with the difference in the positions at which the flange parts 660 and 670 are placed in addition to the interval Δx between the plate members 10 and 20. A difference in position is that the positions of the flange parts 660 and 670 are different from each other when viewed from a center of each plate member. Alternatively, when viewed in the extending direction of each of the plates, it is understood that the positions at which the flange parts 660 and 670 are provided are different from each other so that one of the flange parts 660 and 670 is further placed at a position further extending in the extending direction of the plate. Thus, it is possible to provide the conductive resistance sheet 60 having a longer length, and the advantage that thermal conductivity by the conductive resistance sheet is reduced may be expected.

The conductive resistance sheet 60 has a first surface 601 and a second surface 602 to be welded corresponding to the respective flange parts 660 and 670, and a boundary between the surfaces 601 and 602 may be bent. Each of the first surface 601 and the second surface 602 has a surface that is exposed to the vacuum space part.

The shielding part 62 is disposed to shield the entire outer surface of the conductive resistance sheet 60. A cover 680 may be placed on the outer side of the shielding part 62, and the cover 680 covers the flange parts 660 and 670 together with the shielding part 62. An inner end of the cover 680 covering the inner flange 660 may be aligned with the first plate member 10. That is, an inner surface of the first plate member 10 and an inner surface of the cover 680 may be aligned with each other. Thus, it may be expected that the inner surface of the cavity 100 is provided flat, and another member covering the inner surface of the first plate member 10 is not required.

As an outer end of the cover 680 is disposed outside of the cavity, an inner volume of the cavity is not adversely affected. Also, there is no problem because it may not be seen by a separate member when mounted on the device.

Figure 11:
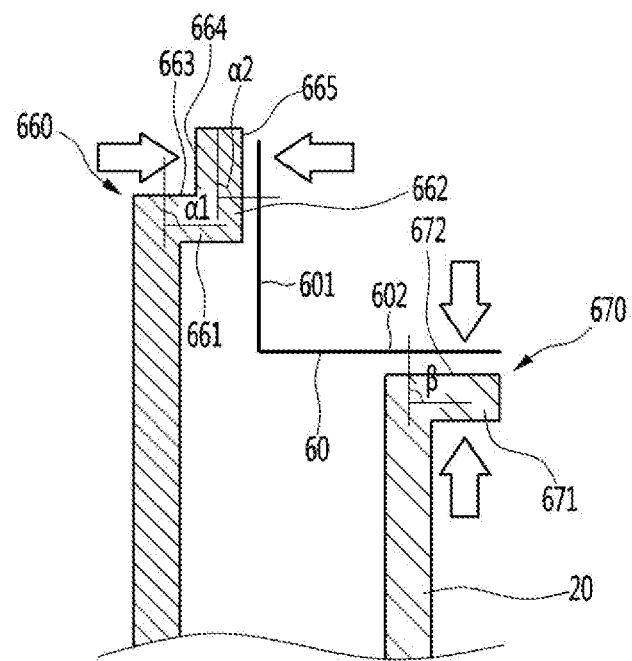
FIG. 11 is a detailed view illustrating the flange part of the plate member.

The above-described operation will be described in more detail with reference to the detailed configuration diagram of the flange part of FIG. 11. Referring to FIG. 11, the end of the first plate member 10 may be bent outward once to provide a first inner extension part 661. The first inner extension part 661 may be bent at a predetermined first bent angle α1 with respect to the extension direction of the first plate member 10. Following the first inner extension part 661, the first plate member may be folded again inward to provide a second inner extension part 662. The second inner extension part 662 may be bent at a predetermined second bent angle α2 with respect to the extension direction of the first inner extension part 661.

The outer surface of the first inner extension part 661 may provide a first place part 663 on which the inner end of the cover 680 may be placed. The outer surface of the second inner extension part 662 may provide a second place part 664 on which an inner surface of the inner end of the cover 680 may be placed. The inner surface of the inner second extension part 662 may provide an inner coupling surface 665 to which the conductive resistance sheet 60 is welded.

The first bent angle and the second bent angle may be larger than 0 degrees and smaller than 180 degrees. The bent angle may be considered as an average of an entire cross-section of the member.

If the first bent angle is too large, it is difficult to process the plate member, a strength of the plate member becomes weak, and the interval Δy due to the positions of the inner and outer flange parts 660 and 670 becomes narrow. On the other hand, if the first bent angle is too small, there is a limitation that the interval at which the cover 680 may be placed is narrow and a stepped portion may occur. In view of this point, the size of the first bent angle may be 90 degrees. However, embodiments are not limited thereto.

If the second bent angle is too large, it is difficult to process the plate member, a strength of the plate member becomes weak, and welding of the conductive resistance sheet 60 becomes difficult. On the contrary, if the second bent angle is too small, there is a limitation that the guide action of the second place part 664 is difficult as an interval over which the cover 680 is placed. In view of this point, the size of the first bent angle may be 90 degrees. However, embodiments are not limited thereto.

Properties of the first bent angle, the second bent angle, and the inner extension parts 661 and 662 do not act independently of each other, but may have a specific correlation with each other. For example, when the first bent angle is large, the second bent angle is large, the length of the first extension part 661 is small, and the length of the second extension part 662 is long, the end of the cover 680 may be fitted into the space part between the pair of inner extension parts 661 and 662 so that welding of the end of the conductive resistance sheet 60 is carried out without fail.

The inner coupling surface 665 has an inner coupling surface angle ($\alpha 1 - \alpha 2$) corresponding to a composite angle of the first bent angle and the second bent angle, more precisely, a value obtained by subtracting the second bent angle from the first bent angle. The inner coupling surface bent angle may be based on the extension direction of the first plate member 10.

The end of the second plate member 20 may be bent outwardly at a third bent angle β to provide the outer first extension part 671. The inner surface of the outer first extension part 671 may provide an outer coupling surface 672 so that the outer coupling surface bent angle may have the same value as the third bent angle β.

The reworking is possible in the case where the welding of the vacuum adiabatic body is not properly performed will be described in detail. The coupling of the vacuum adiabatic body to the respective member contact surfaces may perform leak-free vacuum perfectly by performing welding. As the conductive resistance sheet 60 is thin, in order to perform the welding, the welding should be performed while pressing the plate member and the conductive resistance sheet.

Figure 12:
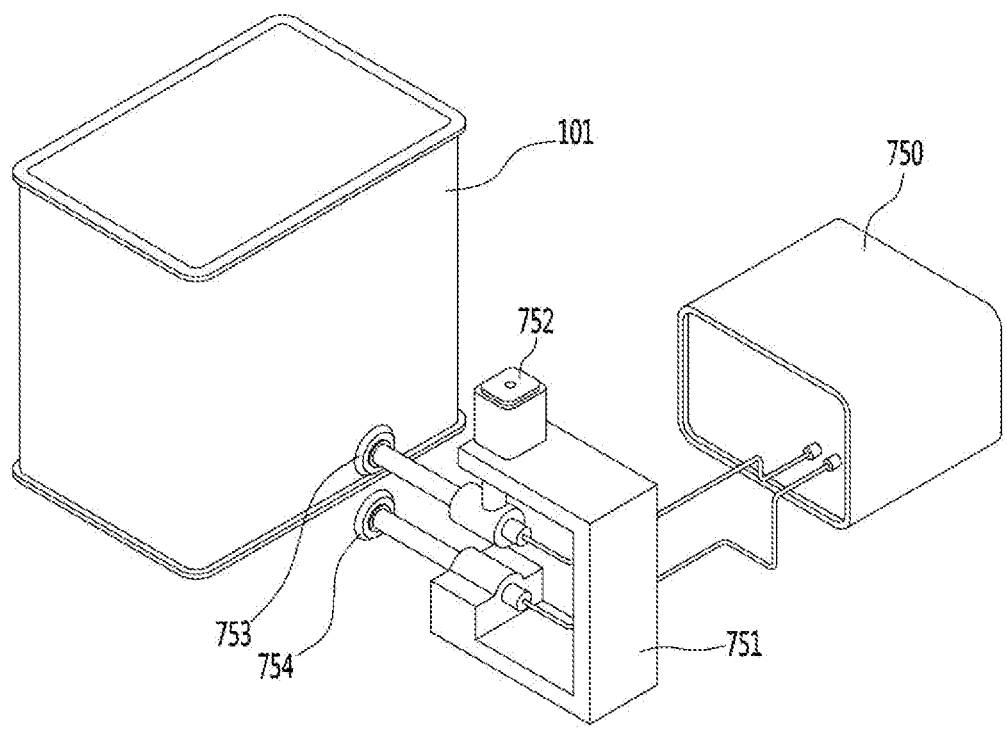
FIG. 12 is a view for explaining a welding device and an example in which a conductive resistance sheet is welded.

FIG. 12 is a view for explaining a welding device and an example in which the conductive resistance sheet is welded. Referring to FIG. 12, in the embodiment, a seam welding machine is used for welding. The seam welding machine includes a power source 750, a pair of roller electrodes 753 and 754 connected to the power source 750, and a pressurizer 752 for pressurizing the roller electrodes to approach each other.

The seam welding machine causes current to flow to the roller electrodes 753 and 754 while the pair of roller electrodes 753 and 754 is pressurized by the pressurizer 752. The two members may be fused by heat generated at contact surfaces between the two members to be welded. The roller electrodes 753 and 754 rotate slowly and may move to the welding site. This operation may cause welding between members.

Referring again FIG. 11, in the seam welding machine, the plate members 10 and 20 and the conductive resistance sheet 60 are inserted between the pair of roller electrodes 753 and 754. In this state, when the seam welding machine operates, fusion occurs at the contact surface between the coupling surfaces 665 and 672 and the conductive resistance sheet 60.

In case of FIGS. 8A and 8B, the pair of flange parts extend in the same direction. Therefore, it is not possible to perform a vacuum test after welding and rework if there is leakage. In other words, one side to be supported for performing welding is located in the inner space of the vacuum adiabatic body. Therefore, any one of the pair of roller electrodes may not be supported.

As described above, in the case of the flange structure proposed in FIGS. 8C, 10, and 11, the inner coupling surface bent angle and the outer coupling surface bent angle are different from each other. As a result, both sides to be supported by the roller electrodes 753 and 754 are exposed to the outside during the welding operation, although depending on the length and the contact of the inner coupling surface 665 and the outer coupling surface 672. Thus, if there is a vacuum leak after the vacuum adiabatic body is re-assembled, welding to the flange parts 660 and 670 may be performed again.

For the purpose of supporting the vacuum adiabatic body in the welding operation and for convenience of welding work, the inner coupling surface angle and the external coupling surface angle may be 90 degrees as shown in the figures. Also, in order to prevent the roller electrodes from interfering with each other, positions of the flange parts 660 and 670 may be different from each. Further, the inner flange part is provided with two inner extension parts 661, 662, so as to provide an interval in which the cover 680 is placed within the cavity 100.

In case of FIGS. 8A and 8B, the ends of the plate members 10 and 20 (the pair of flange parts 65 in the case of FIG. 8B) extend in the same direction so that at least one of the support surfaces of the roller electrodes for welding is disposed inside of the vacuum adiabatic body. A size and shape of the roller electrode varies depending on a price of the welding machine. If the size of the roller electrode is not sufficiently smaller than the height of the vacuum space of the vacuum adiabatic body, welding may not be possible in the case of FIGS. 8A and 8B.

Thus, in the case of FIG. 8C, there is an advantage in that a sufficient space for inserting the roller electrodes into the vacuum adiabatic body is ensured irrespective of the specification of the roller electrodes even if a thickness of the vacuum adiabatic body is small (in terms of increasing a volume of the refrigerator). That is, there is an advantage that a sufficient space for inserting the roller electrodes is ensured not only in the re-welding but also in the initial welding. In addition, as the stepped portion does not occur on the inner edge of the inner space of the refrigerator, which is provided as the vacuum adiabatic body, the inner space of the cavity may further increase, and a separate finishing process for safety of the user is unnecessary.

Figure 9A:
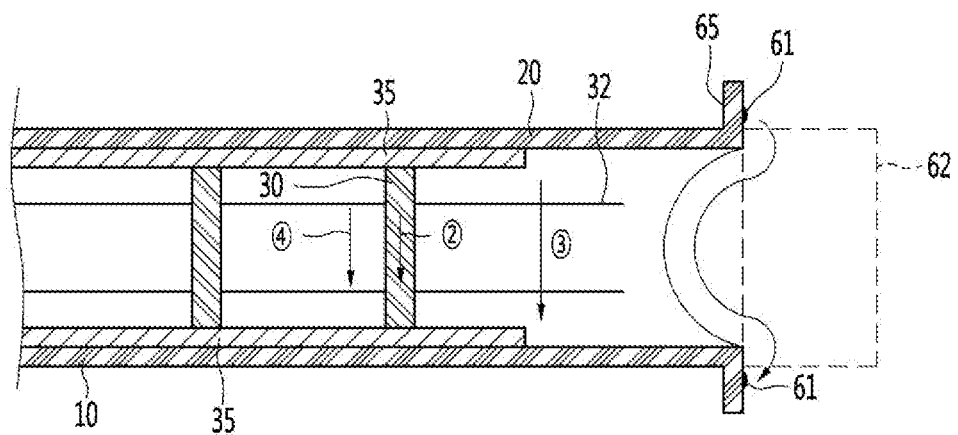
FIGS. 9A-9B are views illustrating another example of a flange of a plate member.
Figure 9B:
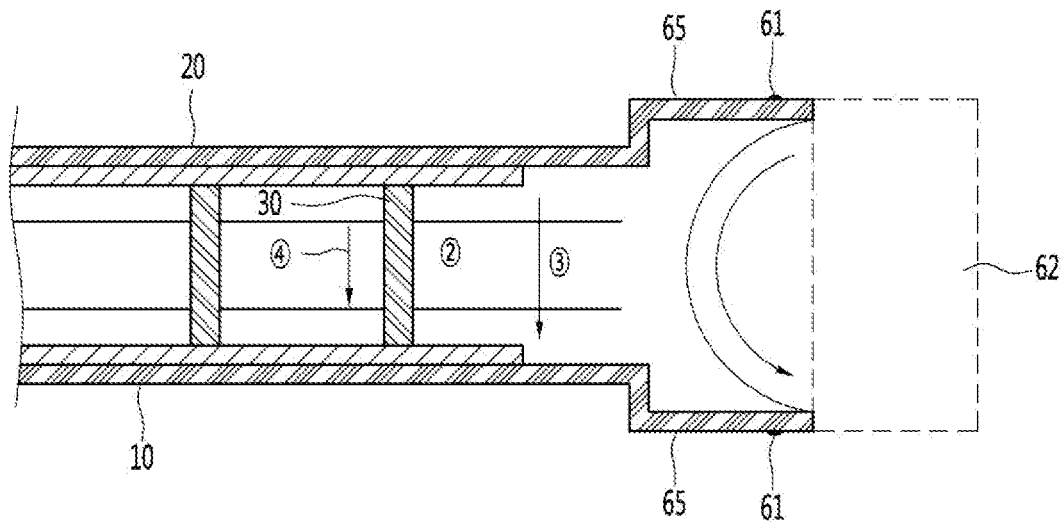

FIG. 8C illustrates various modifications, and FIGS. 9A and 9B illustrate an example thereof. Referring to FIGS. 9A and 9B, a common point of variations is that the roller electrodes 753 and 754 are pressurized and welded to the outside of the third space by pressurizing the flange parts 65 of the first plate member 10 and the second plate member 20, at least one of the member and the flange part of the second plate member 20 is bent outwardly of the third space. In this form, both the flange parts of the edge of the first plate member and the second plate member are bent outwardly of the vacuum space part.

FIG. 9A illustrates that the ends of the plate members 10 and 20 extend outwardly, that is, in a direction perpendicular to the plane, when the two-dimensional inner space of the vacuum adiabatic body is defined inward. FIG. 9B is characterized in that, in addition to the configuration of FIG. 9A, the ends of the plate members 10 and 20 further extend in the extending direction of the vacuum adiabatic body, that is, the extending direction of the plane. Accordingly, welding may be performed irrespective of the size of the roller electrode.

Figure 13:
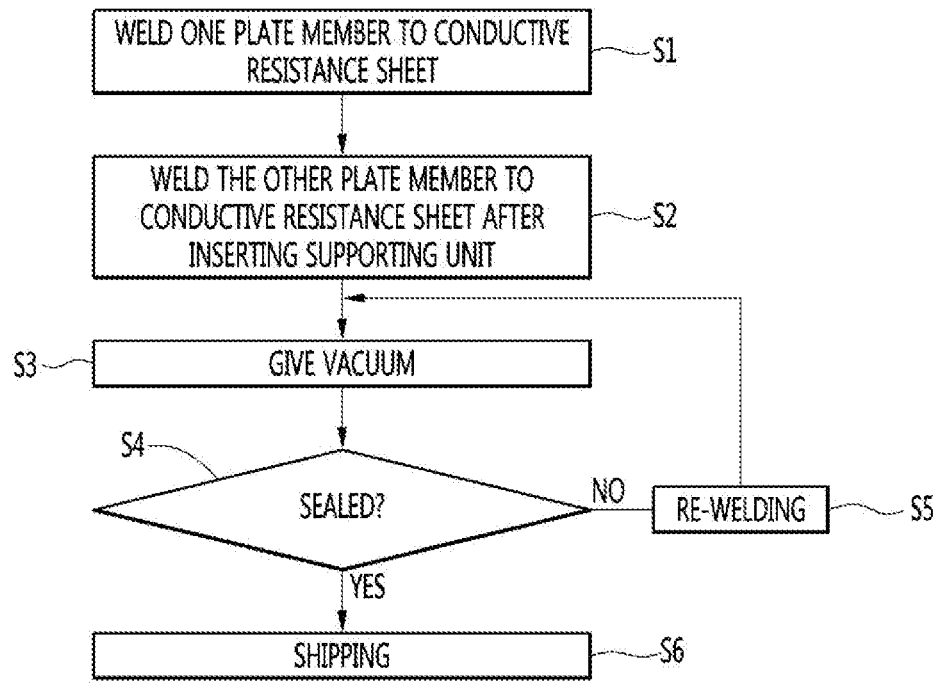
FIG. 13 is a flowchart for explaining a method for manufacturing a vacuum adiabatic body.

FIG. 13 is a flowchart for explaining a method for manufacturing the vacuum adiabatic body. Referring to FIG. 13, one of the plate members and the conductive resistance sheet is welded (S1). Then, the other of the plate members and the conductive resistance sheet is welded (S2). When the welding process of the two places is completed, it may be considered that sealing of the inner space of the vacuum adiabatic body is completed.

When the vacuum adiabatic body is manufactured, a vacuum pump is connected to a port to exhaust the air inside of the vacuum adiabatic body (S3). After the exhaust is performed, it is determined whether or not vacuum sealing is maintained (S4). If the vacuum sealing is maintained (S6), it is shipped (S6). If the vacuum sealing is not maintained, re-welding is performed (S5), and then the vacuum application process is performed again (S3). According to the above-described process, product yield of the vacuum adiabatic body may be improved by performing the rework even if there is a small incomplete weld at the time of welding.

According to the present embodiment, it has been described that the length of the conductive resistance sheet becomes long even if the thickness of the vacuum adiabatic body is the same. Effects that are capable of being obtained in this case will be described.

Tables 1 to 3 show the adiabatic load when the internal size of the cavity is 400*600*400 mm (96 liters), external air is 25 degrees Celsius, a high temperature is 4 degrees Celsius, and all the doors are made of polyurethane foam. Table 1 shows the case where polyurethane is used as the cavity, Table 2 shows the case where the length of the conductive resistance sheet is 0.008 meter, and FIG. 3 shows the case where the conductive resistance sheet has the length of 0.016 meter.

TABLE 1

| | Cabinet (5 faces) | Door | Gasket | |
|---|---|---|---|---|
| Area [m$^2$] | 1.04 | 0.24 | | |
| Adiabatic thickness L[m] | 0.03 | 0.03 | Circumferential length [m] | 2 |
| ΔT [° C.] | 21 | 21 | ΔT [° C.] | 21 |
| k, PU[W/m ° C.] | 0.019 | 0.019 | [W/m° C.] | 0.05 |
| h[W/m$^2$ ° C.] | 6 | 6 | | |
| R_th[° C./W] | 1.84 | 7.97 | | |
| Q[W] | 11.42 | 2.64 | Q_gasket | 2.10 |
| Q_total[W] | | | 16.16 | |

TABLE 2

| | Cabinet (5 faces) | Door | Conductive resistance sheet | |
|---|---|---|---|---|
| Area A[m$^2$] | 1.04 | 0.24 | Circumferential length [m] | 2 |
| Adiabatic thickness L[m] | 0.03 | 0.03 | Thin film thickness [mm] | 0.05 |
| ΔT [° C.] | 21 | 21 | Thin film length [m] | 0.008 |
| k, PU[W/m ° C.] | 0.019 | 0.019 | Area A[m$^2$] | 0.0001 |
| h[W/m$^2$ ° C.] | 6 | 6 | ΔT [° C.] | 21 |
| R_th[° C./W] | 5.13 | 7.97 | K_SUS[W/m ° C.] | 16 |
| Q[W] | 4.10 | 2.64 | Q_Thin film | 4.2 |
| Q_total[W] | | | 13.03 | |

The gasket part in Table 1 may be provided similarly in Table 2.

TABLE 3

| | Cabinet (5 faces) | Door | Conductive resistance sheet | |
|---|---|---|---|---|
| Area A[m$^2$] | 1.04 | 0.24 | Circumferential length [m] | 2 |
| Adiabatic thickness L[m] | 0.03 | 0.03 | Thin film thickness [mm] | 0.05 |
| ΔT [° C.] | 21 | 21 | Thin film length [m] | 0.016 |
| k, PU[W/m ° C.] | 0.019 | 0.019 | Area [m$^2$] | 0.0001 |
| h[W/m$^2$ ° C.] | 6 | 6 | ΔT [° C.] | 21 |
| R_th[° C./W] | 5.13 | 7.97 | K_SUS[W/m ° C.] | 16 |
| Q[W] | 4.10 | 2.64 | Q_Thin film | 2.1 |
| Q_total[W] | | | 10.93 | |

Figure 14:
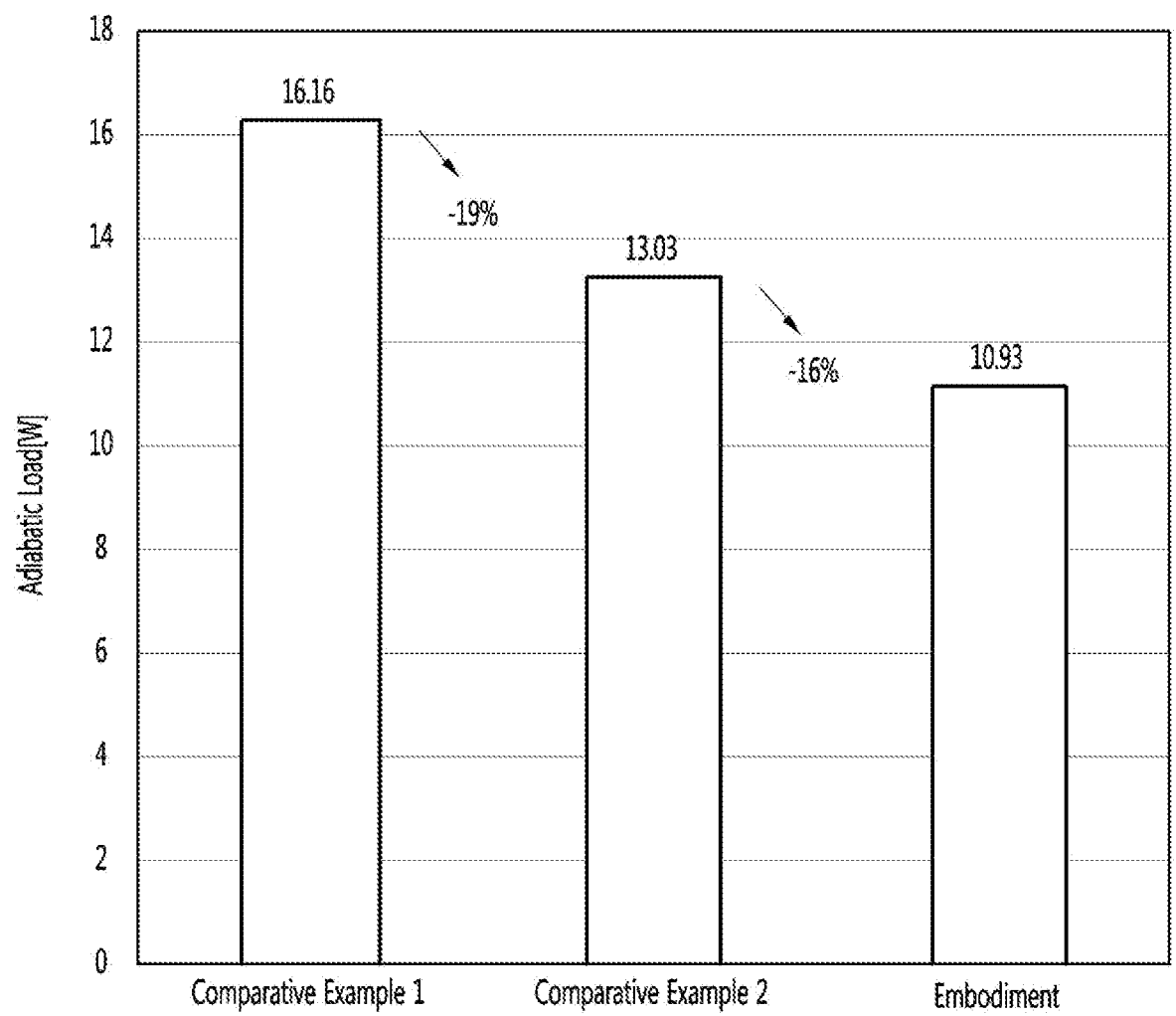
FIG. 14 is a graph for explaining an adiabatic load.

The gasket part in Table 1 may be provided similarly in Table 2. FIG. 14 is a view illustrating the adiabatic load presented as results of Tables 1 to 3 above. Referring to FIG. 14, it is confirmed that an adiabatic load that is more reduced may be obtained when the conductive resistance sheet having a pair of bent surfaces is applied to increase a heat conduction path of the conductive sheet. For example, an adiabatic load reduction effect of 16% was obtained as compared with the case of using a straight conductive resistance sheet.

Figure 15:
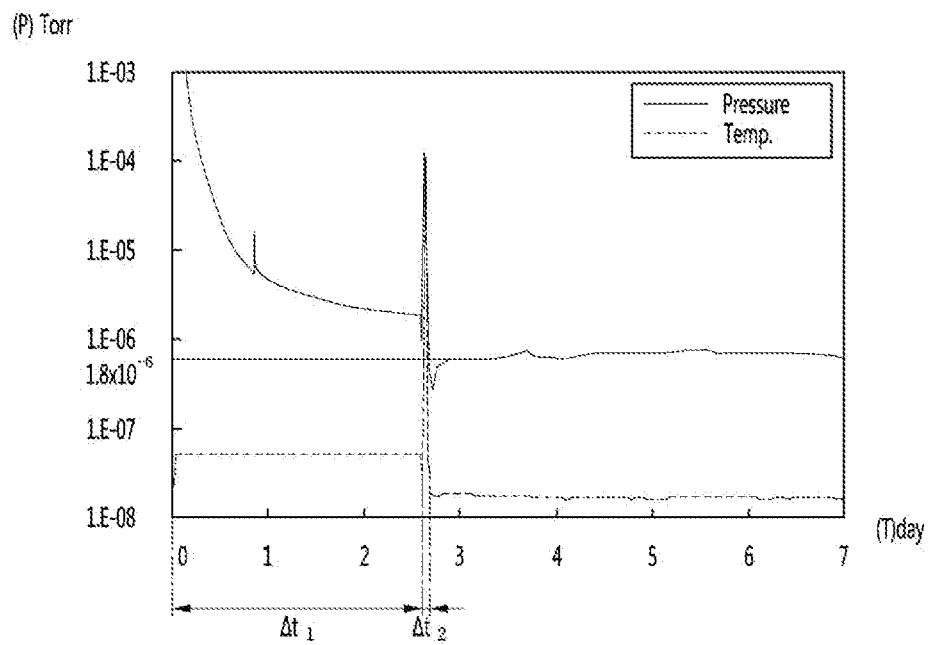
FIG. 15 is a graph illustrating results obtained by observing a time and a pressure in a process of exhausting the inside of the vacuum adiabatic body when a supporting unit is used.

FIG. 15 is a graph illustrating results obtained by observing a time and a pressure in a process of exhausting the inside of the vacuum adiabatic body when a supporting unit is used. Referring to FIG. 15, in order to create the vacuum space part 50 to be in the vacuum state, a gas in the vacuum space part 50 is exhausted by a vacuum pump while evaporating a latent gas remaining in parts of the vacuum space part 50 through baking. However, if the vacuum pressure reaches a certain level or more, there exists a point at which the level of the vacuum pressure is not increased any more (ΔT1). After that, the getter is activated by disconnecting the vacuum space part 50 from the vacuum pump and applying heat to the vacuum space part 50 (ΔT2). If the getter is activated, the pressure in the vacuum space part 50 is decreased for a certain period of time, but then normalized to maintain a vacuum pressure of a certain level. The vacuum pressure that maintains the certain level after activation of the getter is approximately 1.8×10−6 Torr.

In the embodiment, a point at which the vacuum pressure is not substantially decreased any more even though the gas is exhausted by operating the vacuum pump is set to a lowest limit of the vacuum pressure used in the vacuum adiabatic body, thereby setting a minimum internal pressure of the vacuum space part 50 to 1.8×10−6 Torr.

Figure 16:
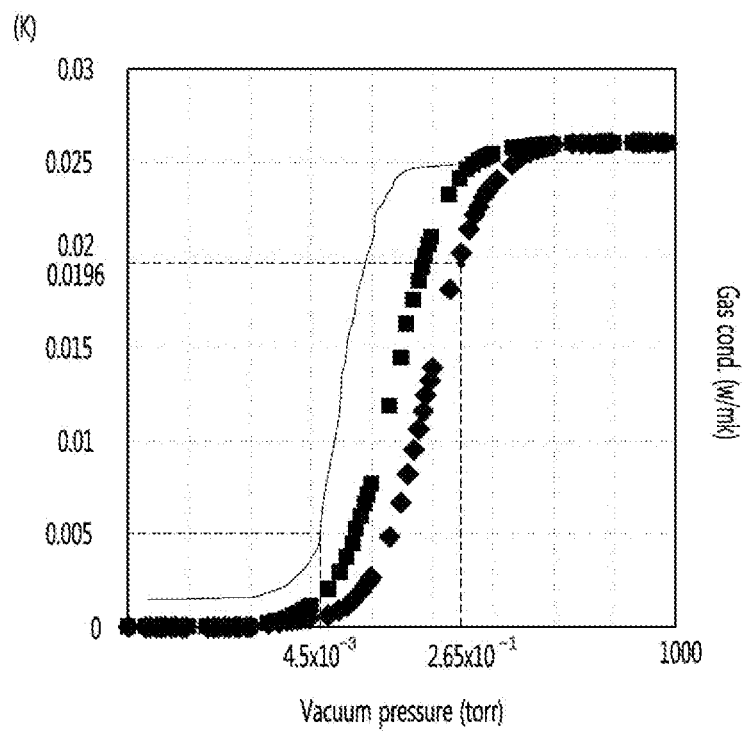
FIG. 16 is a graph illustrating results obtained by comparing a vacuum pressure with gas conductivity.

FIG. 16 is a graph obtained by comparing a vacuum pressure with gas conductivity. Referring to FIG. 16, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside of the vacuum space part 50, the gap is a distance between the radiation resistance sheet 32 and the plate member adjacent thereto. When the radiation resistance sheet 32 does not exist inside of the vacuum space part 50, the gap is a distance between the first and second plate members.

It was seen that, as the size of the gap is small at a point corresponding to a typical effective heat transfer coefficient of 0.0196 W/mK, which is provided to a adiabatic material formed by foaming polyurethane, the vacuum pressure is 2.65×10−1 Torr even when the size of the gap is 2.76 mm. It was seen that the point at which reduction in adiabatic effect caused by gas conduction heat is saturated even though the vacuum pressure is decreased is a point at which the vacuum pressure is approximately 4.5×10−3 Torr. The vacuum pressure of 4.5×10−3 Torr may be defined as the point at which the reduction in adiabatic effect caused by gas conduction heat is saturated. Also, when the effective heat transfer coefficient is 0.1 W/mK, the vacuum pressure is 1.2×10−2 Torr.

When the vacuum space part 50 is not provided with the supporting unit but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately 2.0×10−4 Torr. Also, the vacuum pressure at the point at which the reduction in adiabatic effect caused by gas conduction heat is saturated is approximately 4.7×10−2 Torr. Also, the pressure where the reduction in adiabatic effect caused by gas conduction heat reaches the typical effective heat transfer coefficient of 0.0196 W/mK is 730 Torr.

When the supporting unit and the porous material are provided together in the vacuum space part, a vacuum pressure may be created and used, which is in the middle between the vacuum pressure when only the supporting unit is used and the vacuum pressure when only the porous material is used.

Figure 17:
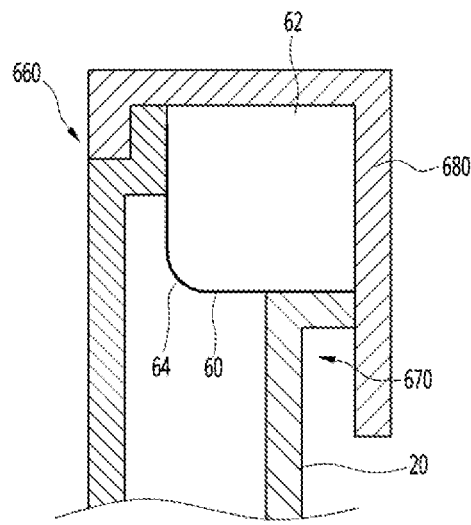
FIG. 17 is a cross-sectional view illustrating an end of a plate member according to another embodiment and FIG. 18 is a cross-sectional view illustrating an end of a plate member according to further another embodiment.

FIG. 17 is a cross-sectional view illustrating an end of a plate member according to another embodiment. Referring to FIG. 17, the configuration of the conductive resistance sheet 60 is different from that of the conductive resistance sheet 60, and the other parts are the same as the previously described embodiment. Thus, description of other parts is intended to be applied to the contents of the embodiments described.

The conductive resistance sheet 60 according to another embodiment is provided in such a shape that the contact portion between the first surface 601 and the second surface 602, which extend at different angles, is gently bent. As this shape is provided, it is possible to prevent deformation that may occur additionally to the conductive resistance sheet when vacuum pressure is applied. Therefore, it is possible to obtain the effect of preventing damage to the conductive resistance sheet and prevent fatigue damage of the conductive resistance sheet, thereby preventing fatigue damage of the vacuum adiabatic body.

Figure 18:
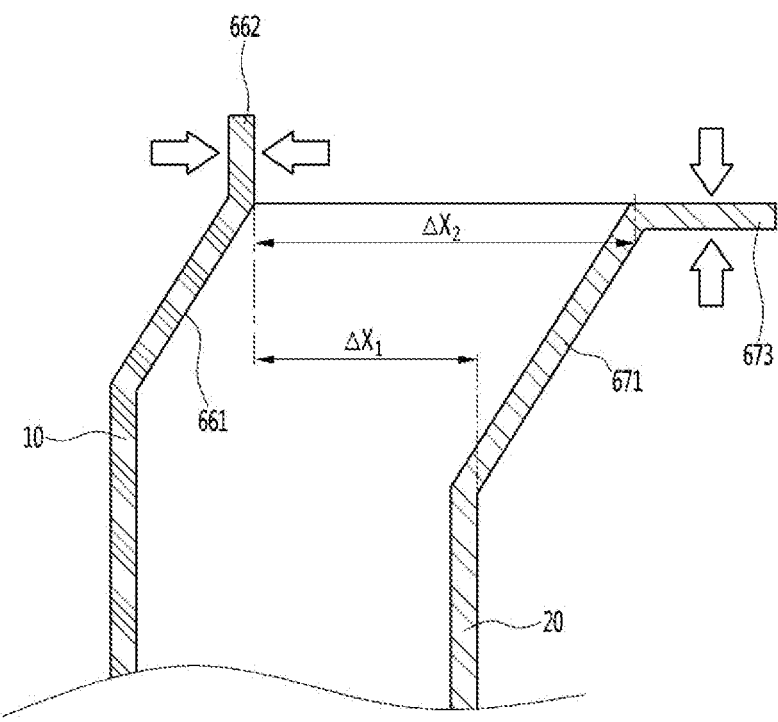

FIG. 18 is a cross-sectional view illustrating an end of a plate member according to further another embodiment. Referring to FIG. 18, first inner extension part 661 and first outer extension part 671 are provided at an angle of approximately 45 degrees, and second outer extension part 671 is provided with an second outer extension part 673. According to embodiments, a distance of the conductive resistance sheet may be longer than a thickness of the vacuum adiabatic body. This further reduces conduction heat transfer.

Hereinafter, another embodiment will be described.

In above-described embodiment, the refrigerator applied to the vehicle has been mainly described. However, embodiments are not limited thereto. For example, the ideas may be applied to a warming refrigerator and a cooling and warming refrigerator. Of course, the embodiments are not limited to a vehicle, but may be applied to any apparatus that generates a desired temperature of a product. However, it would be advantageous for the vehicle refrigerator.

Particularly, in the case of the warming apparatus, a direction of the refrigerant may be configured to be opposite to that of the refrigerator. In the case of the cooling and warming apparatus, four sides that reverse the direction of the refrigerant may be installed on the refrigerant passage according to whether the refrigerant operates as a refrigerator or a warming apparatus.

The condensation module may be referred to as a first heat exchange module or first heat exchanger, and the evaporation module may be referred to as a second heat exchange module or second heat exchanger regardless of the change of the refrigerator and the warming apparatus. The first and second meanings denote the division of the heat exchange module and may be exchanged with each other.

The first inner extending part may extend as it is in the extension direction of the inner plate member without a bent angle. In this case, the inner flange part and the outer flange part may be different from each other in bent angle, so that the effect of reworking is obtained as it is when welding fails. Also, as the position of the flange at the end of the plate member varies, the length of the conductive resistance sheet may increase.

According to embodiments, a vehicle refrigerator that receives only power from outside and which is an independent apparatus may be efficiently realized.

The invention claimed is:

1. A vacuum adiabatic body, comprising:
a first plate defining at least a portion of a wall for a first space;
a second plate defining at least a portion of a wall for a second space having a second temperature different from a first temperature of the first space;
first and second sealings that seal the first plate and the second plate to provide a third space having a third temperature between the first temperature and the second temperature, wherein the third space is a vacuum space; and
a heat resistance unit that reduces heat transfer between the first plate and the second plate and comprises at least one conductive resistance sheet made of the same material as the first and second plates, wherein the first sealing includes a first welding portion of a first flange of the first plate and the at least one conductive resistance sheet, and the second sealing includes a second welding portion of a second flange of the second plate and the at least one conductive resistance sheet, wherein the first plate comprises a first plate body, and the first flange including a first bent portion that is bent toward an outside of the vacuum adiabatic body from the first plate body and a second bent portion that is bent from the first bent portion, wherein the second plate comprises the second flange including a bent portion that is bent toward the outside of the vacuum adiabatic body, wherein at least one of the first welding portion or the second welding portion includes a rewelding portion formed by performing a rewelding of a welded portion to allow a vacuum state in the third space to be maintained.

2. The vacuum adiabatic body according to claim 1, wherein the first bent portion of the first flange extends in a direction substantially perpendicular to the second bent portion of the first flange.

3. The vacuum adiabatic body according to claim 2, wherein a coupling surface, on which the first welding portion is provided, of the first flange of the first plate and a coupling surface, on which the second welding portion is provided, of the second flange of the second plate extend in directions substantially perpendicular to each other.

4. The vacuum adiabatic body according to claim 1, wherein at least one of the first flange of the first plate or the second flange of the second plate is pressurized by a roller electrode and welded outside of the third space.

5. The vacuum adiabatic body according to claim 1, further comprising a cover disposed at an outside of the at least one conductive resistance sheet, wherein the cover is configured to shield the second bent portion of the first flange and to be coplanar with respect to the first plate body.

6. The vacuum adiabatic body according to claim 5, wherein the first and second bent portions of the first flange form a wall in an inner space of a refrigerator.

7. The vacuum adiabatic body according to claim 5, wherein a shield is provided between the cover and the at least one conductive resistance sheet.

8. The vacuum adiabatic body according to claim 1, wherein the at least one conductive resistance sheet includes a first surface coupled to the first plate by the first welding portion and a second surface coupled to the second plate by the second welding portion, wherein the first and second surfaces of the at least one conductive resistance sheet are exposed to the third space, and wherein the first and second surfaces extend in directions substantially perpendicular to each other.

9. The vacuum adiabatic body according to claim 2, wherein the first bent portion extends in a direction substantially perpendicular to the first plate body.

10. The vacuum adiabatic body according to claim 1, wherein the second bent portion of the first flange of the first plate and the bent portion of the second flange of the second plate extend in a same direction.

11. The vacuum adiabatic body according to claim 1, wherein the first welding portion is provided on the second bent portion of the first flange and the second welding portion is provided on the bent portion of the second flange.

12. The vacuum adiabatic body according to claim 11, wherein the first surface includes a first portion coupled to the second bent portion of the first flange by the first welding portion and a second portion, and wherein the third space is formed between the first plate body and the second portion of the first surface.

13. The vacuum adiabatic body according to claim 1, wherein the first and second bent portions are continuously provided on the first flange of the first plate.

14. The vacuum adiabatic body according to claim 1, wherein the first flange of the first plate further extends along an extension direction of the first and second plates when compared with the second flange of the second plate, and wherein coupling surfaces of the first and second flanges, to which the at least one conductive resistance sheet is coupled to be sealed, extend in directions substantially perpendicular to each other.

15. A method for manufacturing a vacuum adiabatic body, the method comprising:
welding at least one of a first plate or a second plate to at least one conductive resistance sheet to provide the vacuum adiabatic body;
exhausting air to vacuumize an inner space of the vacuum adiabatic body; and
determining whether the inner space of the adiabatic body is vacuumized to perform a re-welding of a welded portion when a vacuum state is not maintained, wherein the welded portion is provided at a flange of at least one of the first plate or the second plate, and the flange is bent.

16. The method according to claim 15, wherein the welding is performed using a seam welding machine provided with a roller electrode.

\* \* \* \* \*